United States Patent
Adrian et al.

(10) Patent No.: US 10,780,376 B2
(45) Date of Patent: Sep. 22, 2020

(54) BREAK-AWAY FILTER HOUSING APPARATUS

(71) Applicant: Saint-Gobain Performance Plastics Corporation, Solon, OH (US)

(72) Inventors: Kenneth D Adrian, Manassas, VA (US); ZhenWu Lin, Pasadena, CA (US)

(73) Assignee: SAINT GOBAIN PERFORMANCE PLASTICS, Solon, OH (US)

( * ) Notice: Subject to any disclaimer, the term of this patent is extended or adjusted under 35 U.S.C. 154(b) by 564 days.

(21) Appl. No.: 15/415,842

(22) Filed: Jan. 25, 2017

(65) Prior Publication Data
US 2017/0209816 A1 Jul. 27, 2017

Related U.S. Application Data

(60) Provisional application No. 62/286,762, filed on Jan. 25, 2016.

(51) Int. Cl.
*B01D 29/05* (2006.01)
*B01D 35/30* (2006.01)
(Continued)

(52) U.S. Cl.
CPC ............. *B01D 29/05* (2013.01); *B01D 35/30* (2013.01); *B01D 63/087* (2013.01); *B01D 69/10* (2013.01);
(Continued)

(58) Field of Classification Search
CPC ...... B01D 29/05; B01D 63/087; B01D 69/10; B01D 35/30; B01D 2313/58;
(Continued)

(56) References Cited

U.S. PATENT DOCUMENTS

| 4,444,661 A | 4/1984 | Jackson et al. |
| 4,874,513 A * | 10/1989 | Chakraborty ........ B01D 29/012 210/321.84 |

(Continued)

FOREIGN PATENT DOCUMENTS

| FR | 2 433 965 A1 | 3/1980 |
| WO | 2011034296 A2 | 3/2011 |

OTHER PUBLICATIONS

GE Healthcare Life Sciences, Whatman Disposable Filter Funnel, Product Brochure; Feb. 2013, US.
(Continued)

*Primary Examiner* — Krishnan S Menon
*Assistant Examiner* — Waqaas Ali
(74) *Attorney, Agent, or Firm* — Lorusso & Associates

(57) ABSTRACT

A disposable filter cup and stem assembly with a filter disc or membrane secured between the cup and the stem. A frangible filter cup disengagement strip is formed on the filter cup about an end adjacent the stem. The filter disc or membrane is secured in the assembly in close proximity to the disengagement strip. Force applied to the disengagement strip separates the filter cup from the stem to expose the top, upstream surface of the filter disc or membrane and to permit removal of the filter disc from the assembly in an intact, substantially horizontal position. A disposable filter capsule assembly formed with a frangible filter capsule disengagement strip encloses a filter disc or membrane and permits separation of the capsule into two sections so as to expose an upstream surface of the filter disc or membrane and to permit removal of the filter disc or membrane in an intact condition after fluid processing. Disposable filter capsules with capsule halves having mated snap-fit surfaces and optional O-ring or luer lock type sealing surfaces, permit access to enclosed filter discs or membranes after fluid processing. Upon separation of the filter capsule halves, the
(Continued)

upstream surfaces of the enclosed filter discs or membranes are exposed and the discs or membranes are accessible for removal in intact condition. O-ring free media holders constructed with weld spots permit access to enclosed free media by disengaging the weld spots after fluid processing.

20 Claims, 16 Drawing Sheets

(51) Int. Cl.
- *B01D 69/10* (2006.01)
- *B01D 63/08* (2006.01)
- *B01L 3/00* (2006.01)

(52) U.S. Cl.
CPC ........ *B01L 3/5635* (2013.01); *B01D 2201/24* (2013.01); *B01D 2313/02* (2013.01); *B01D 2313/20* (2013.01); *B01D 2313/58* (2013.01); *B01L 2300/0681* (2013.01)

(58) Field of Classification Search
CPC ............ B01D 2313/20; B01D 2313/02; B01D 2201/24; B01L 3/5635; B01L 2300/0681
See application file for complete search history.

(56) References Cited

U.S. PATENT DOCUMENTS

| | | | |
|---|---|---|---|
| 5,230,727 A * | 7/1993 | Pound | B01D 46/0005 210/446 |
| 5,755,842 A * | 5/1998 | Patel | B01D 46/0005 55/330 |
| 5,965,019 A | 10/1999 | Colsen et al. | |
| 6,843,913 B2 | 1/2005 | Grant | |
| 2005/0145627 A1* | 7/2005 | Stull | B65D 41/0414 220/254.3 |
| 2009/0200222 A1* | 8/2009 | DelleMonache | B01D 35/30 210/233 |
| 2013/0043676 A1 | 2/2013 | Baker | |
| 2015/0128806 A1 | 5/2015 | Tesner | |

OTHER PUBLICATIONS

Millipore Sigma, In-Line Filter Holder 47 mm, Product Brochure, Original publication date unknown (discovered approximately on May 15, 2014, US.

Millipore Sigma, All-Glass Filter Holder Assembly with Funnel, Fritted Base, Cap, Clamp, 47 mm, Original publication date unknown (discovered approximately on May 15, 2014, US.

* cited by examiner

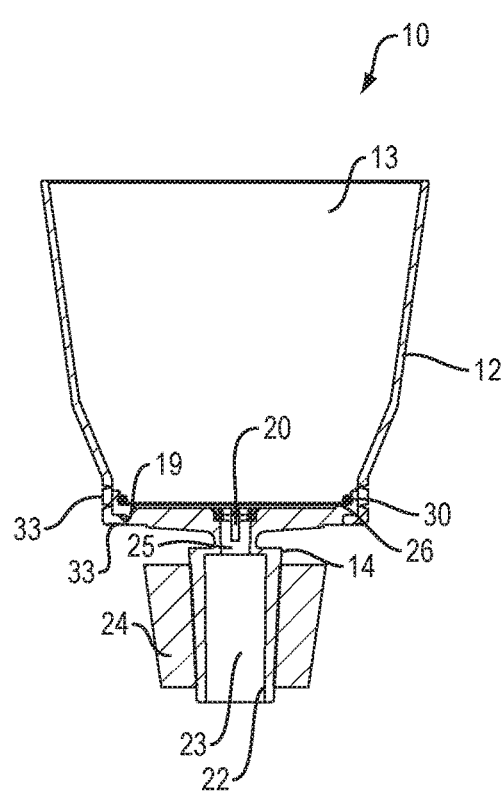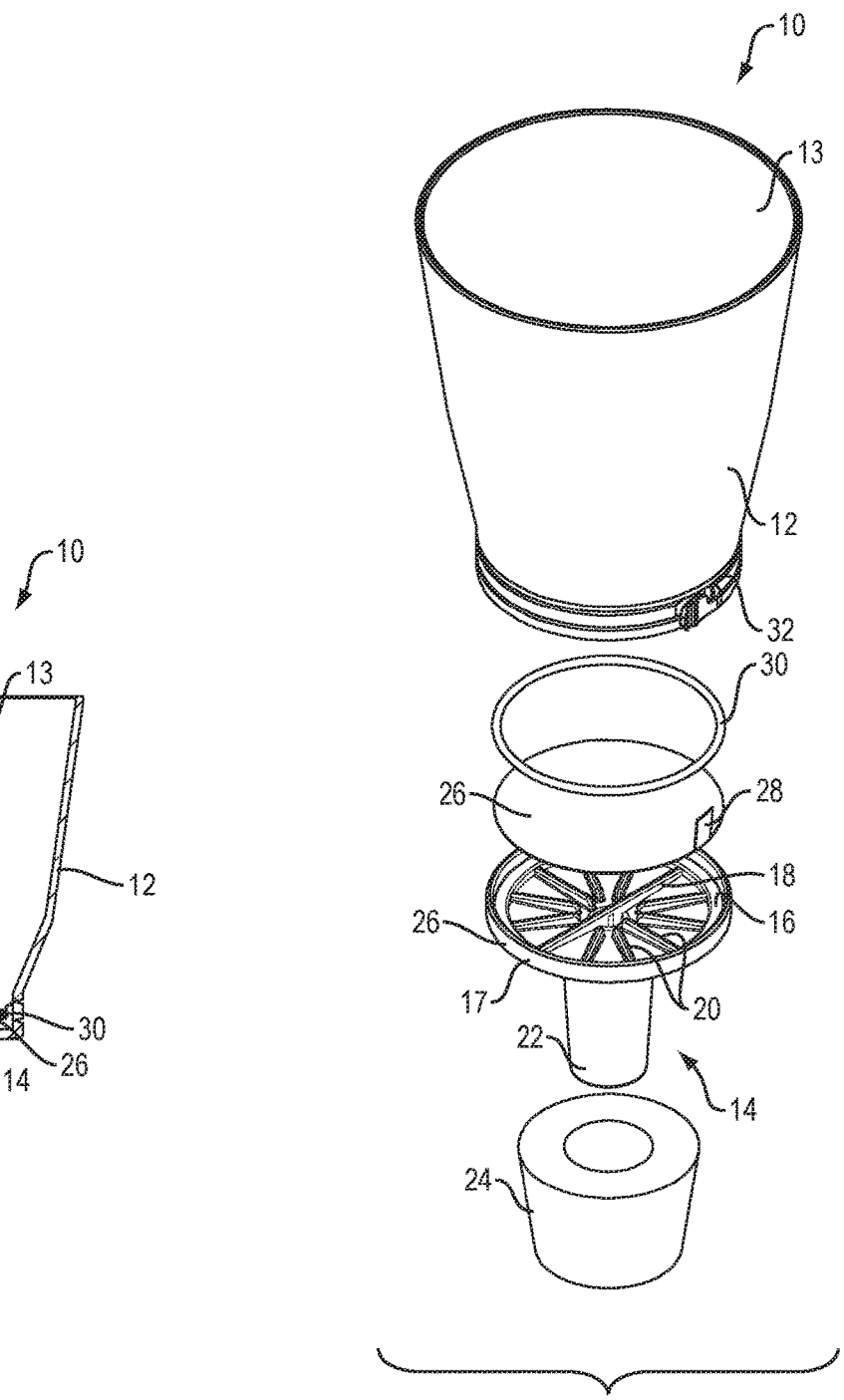
FIG. 1
FIG. 2

BREAK-AWAY FILTER HOUSING APPARATUS

CROSS-REFERENCE TO RELATED APPLICATIONS

This application claims the benefit of U.S. Provisional Application Ser. No. 62/286,762, filed Jan. 25, 2016, the contents of which are incorporated in their entirety herein by reference.

FIELD OF THE DISCLOSURE

The disclosure relates to filter capsule apparatus used to enclose filters that separate and remove solid, liquid and/or gaseous contaminants and/or intermix and introduce one liquid or gas into a second liquid or gas. More particularly, the disclosure concerns disposable filter shells, capsules or housings that permit easy access to an enclosed filter media without disturbing or losing any particulate matter captured by the filter.

BACKGROUND OF THE DISCLOSURE

To filter liquids and/or gases of undesired contaminants, filters and/or purification media e.g., filter membranes, are used in enclosed filter housings, or open filter cups to effectuate contaminant removal. Such filter media are often formed as discs for insertion into application specific holders. Among these holders are filter cups, filter capsules, shells, clamped versions, threaded ring holders and the like.

For laboratory, pilot programs and small scale applications, the ability to use a filter disc and retrieve the trapped particulate matter for analysis is at a premium, unlike full-scale production operations. Thus, the apparatus used to secure the filter disc for filtering operations should be configured to permit quick retrieval of the disc and its trapped contents from within a shell, housing, filter cup, etc.

To that end, multiple different disc holders have been developed to address these concerns. Examples of relevant art filter disc holders include stainless steel disc holders manufactured by ZenPure Corporation. One holder is constructed with an outlet assembly that has a filter disc support surface perforated to permit fluid passage with minimal holdup volume. This particular apparatus includes an inlet assembly placed above the filter disc so as to enclose the disc between the outlet and the inlet. A threaded ring is placed about the inlet and outlet to secure the two components together. An O-ring sandwiched between the outlet and the inlet creates a liquid-tight seal when the ring is torqued onto the inlet and outlet halves of the holder. Ports are provided on the inlet and the outlet halves to permit the introduction and exit of fluid into and out of the filter assembly. The assembly components are made of stainless steel to provide durability and to withstand sterilization procedures such as autoclave sterilization and the like.

In another relevant art filter holder, the same inlet and outlet assemblies are used to secure a removable filter disc. In this apparatus, instead of a ring, a sanitary clamp is used to secure the inlet and outlet assemblies together. The clamp is constructed also from stainless steel to impart durability and sterilization capability.

Although these two disc filter apparatuses provide the intended function, the need to construct the components from expensive metallic materials, such as stainless steel, greatly increases the cost of each unit. Versions made from polymeric materials could be used, but could be subject to degradation or deformation when exposed to sterilization procedures that often employ high temperatures or radiation such as gamma radiation.

Another example of relevant art filter disc holders is an in-line filter holder made by the EMD Millipore Corporation. This apparatus includes an outlet assembly and an inlet assembly that together secure a filter disc. The assemblies are secured together with three threaded rods that have hand-operated knobs. The knob and rod combinations are spaced equally about the top of the inlet. The knob/rods are tightened to secure the inlet and outlet assemblies together and are loosened to permit the assemblies to be separated to remove the filter disc. This design may be particularly suitable for full-scale production operations. The design incorporates multiple components that add to the cost and do not lend themselves to field operations and are not meant to be disposable due to cost.

In yet another example of relevant art disc holders, a glass filter cup with a fritted glass filter support, also made by Millipore, uses an aluminum spring clamp to secure the glass filter cup to the base. This filter cup apparatus is quite costly due to the materials and components used, and is not suitable for field operations due to the rather fragile construction of the assembly components. The apparatus is not intended to be disposable based on its cost.

A still further example of a relevant art disc holder is a filter cup made by GE. This cup includes a stem on which a filter disc is placed. A vertical pull strip is formed on the cup that opens a vertical slot in the cup when pulled to permit access to the filter disc secured in the filter cup. The orientation of the pull strip has at least one substantial drawback. To remove the enclosed filter disc, tweezers or some other pinching implement has to be used to remove the disc from the slot. Removal in this manner requires the filter disc to be removed at a tilted angle out of the cup. This can lead to filtered particulate matter falling off the filter media. For quantitative analyses, in particular, this could lead to significantly erroneous results.

What is needed is a disposable filter disc holder that permits filtration in lab and field settings that can be produced at relatively low cost and that allows simple and rapid access to the disc filter for analysis of the particulate material filtered from a fluid. What is further needed is a filter disc holder that permits easy removal of the filter disc without the loss of filtered particulate matter, particularly when one of the purposes of the filtration process involves quantitative analysis. These and other objects of the disclosure will become apparent from a reading of the following summary and detailed description of the disclosure as well as a review of the appended drawings.

SUMMARY OF THE DISCLOSURE

In one aspect of the disclosure, a filter cup/filter stem assembly includes a filter cup with portions defining a frangible strip formed at a bottom end of the cup to releasably secure the cup to a filter stem subassembly. The strip permits manual separation of the filter cup from the stem to permit easy, rapid access to the enclosed filter. The stem is formed with a filter disc receiving and support surface having an annular shoulder extending upwardly about a perimeter of the receiving surface to function as a lateral stop to secure the filter disc in place in a substantially coaxial orientation with the disc receiving surface. The receiving surface may be formed with a series of ribs to promote fluid flow.

The frangible strip has portions superposed about the filter stem shoulder to releasably lock the stem to the filter cup. An optional O-ring can be used to create a fluid-tight seal between the filter cup and the filter stem. Alternatively, an annular ridge or rib may be formed inside the perimeter shoulder to which the filter disc is attached to create the fluid-tight seal. The filter disc may be formed with, or include, an optional tab, or multiple tabs to facilitate placement and/or removal of the filter disc to or from the filter cup/filter stem assembly.

In another aspect of the disclosure, a hybrid filter cup/filter capsule assembly includes a filter cup secured to, or formed with, an inlet port of a filter capsule. A filter stem may be secured to, or formed with, an outlet port of the filter capsule. The filter capsule is formed from two capsule halves secured together with mating surfaces to create a seal enhanced by the inclusion of an O-ring seal. The O-ring may be formed in multiple embodiments with different cross-sectional shapes including illustratively, star shape, x-shape, square and round.

A filter disc or filter membrane is secured in the filter capsule at the juncture of the mating capsule halves. A frangible strip is superposed about the perimeter surfaces of the capsule halves to secure the halves together. An optional pull tab is formed on the frangible strip to facilitate removal of the frangible strip to permit disassembly of the capsule halves and to permit access to the enclosed filter disc or membrane. The frangible strip may be formed by forming at least two, substantially parallel perforated regions or reduced thickness areas along the length of the frangible strip to create weak zones to separate out a portion of the strip. This aspect of the disclosure may include a secondary or pre-filter disc, membrane, or other secondary media placed in the bottom of the filter cup.

In a further aspect of the disclosure, a hybrid filter cup/filter capsule assembly includes a filter cup with an outlet formed on a bottom of the cup to receive a filter capsule top half. The filter capsule top half is formed with an inlet port dimensioned to receive an outer wall of the filter cup outlet port to permit a friction fit, a welded joint (sonic and/or heat) and/or adhesive connection. Alternatively, the inlet port is dimensioned to be received by an inner wall of the filter cup outlet port. In this aspect of the disclosure, a top radially extended surface of the filter stem forms a bottom half of the filter capsule. A filter cup over-mold ring with a frangible strip formed around the perimeter of the ring permits disengagement of the joined filter stem and filter capsule upper half.

An annular base section of the capsule upper half is formed with an annular perimeter channel defined by an annular shoulder on a radially inward side of the channel. The channel is dimensioned to receive the top surface of the filter stem perimeter shoulder to form an overlapping joint. The radial thickness of the valve stem shoulder may be substantially the same as the radial width of the channel. The over-mold ring is press fit or molded over the joined surfaces to releasably lock or bond the surfaces together. A secondary annular channel may be formed radially inwardly from the annular perimeter channel to receive an optional O-ring.

In a still further aspect of the disclosure, a filter cup/filter stem assembly includes a filter cup formed with an integral filter capsule upper half. The filter cup is formed with a relatively large diameter outlet (functionally a capsule inlet) to maximize flow to the filter disc or membrane. The cup is formed with a filter stem receiving surface formed to register against a perimeter shoulder of the filter stem. An annular channel is formed on the perimeter of the surface and dimensioned to register against the filter stem shoulder. A perimeter edge of a filter disc or membrane is sandwiched between the registration surfaces and an optional O-ring is used to create a fluid-tight seal on the upstream side of the filter disc or membrane.

A filter cup clamp ring is formed with a frangible strip used to permit disengagement of the filter cup from the filter stem. The clamp ring is press fit over the registered surfaces of the filter cup filter stem receiving surface and the filter stem filter disc receiving surface to create a releasable seal between the two components. An optional pull tab is formed on an end of the frangible strip to facilitate removal of the strip. Once the strip is removed, the filter cup can be removed from the filter stem to expose the upstream surface of the filter disc or membrane. The filter stem perimeter should function to keep the filter disc secured on the filter stem until deliberate removal. The filter disc or membrane may be formed with, or include, one or more pull tabs to facilitate removal of the filter disc or membrane. An optional stopper may be secured around a lower end of the filter stem to permit the filter cup/filter stem assembly to be secured to a flask or like reception device to receive the filtered effluent.

In another aspect of the disclosure, a disposable filter capsule is formed with mating capsule halves that when combined, define a filter chamber. An upper capsule half is formed with an inlet in fluid communication with the filter chamber. A bottom annular surface of the upper capsule half is formed with a perimeter channel defined by an annular upper capsule half shoulder on the radial inner edge of the channel. A corresponding perimeter shoulder extends upwardly from an upper surface of a lower capsule half dimensioned to register against the upper capsule half channel. A perimeter edge of a filter disc or membrane is sandwiched between the registered surfaces. An O-ring is secured between the upstream surface of the filter disc or membrane and the bottom surface of the upper capsule half. A dedicated annular O-ring channel may be formed radially inwardly of the channel perimeter shoulder to receive the O-ring.

A flat annular surface is formed inside the perimeter shoulder of the lower capsule half to support the perimeter edge of the filter disc or membrane. The flat surface elevates the filter disc or membrane above the remainder of the lower capsule half to provide a gap for fluid to flow through the filter disc or membrane and out an outlet port formed on the lower capsule half in fluid communication with the capsule chamber. The O-ring compresses the filter disc perimeter edge against the flat annular surface to create a fluid-tight seal.

To secure the two capsule halves together a capsule clamp ring is formed with a frangible strip around a perimeter wall to permit separation of the clamp ring into two sections and allow the separation of the capsule halves. The clamp ring has a "u" shape in cross section with the bottom of the "u" secured against a perimeter surface of the capsule half registration surfaces. The upright legs of the "u" form annular surfaces that register against the outer perimeter surfaces of the capsule halves. These annular surfaces "lock" the registered surfaces of the capsule halves together by supplying an axial force against the registered surfaces to prevent separation. The frangible strip may include a pull tab to facilitate removal of the frangible strip and subsequent separation of the capsule halves. The strip permits manual separation of the filter capsule segments to permit easy, rapid access to the enclosed filter. The annular surfaces of the clamp ring, once separated, may be separated from the perimeter edges of the capsule halves.

The clamp ring is located in substantially the same plane occupied by the enclosed filter disc media or membrane. This orientation permits the disengagement of the capsule halves to expose the upstream surface of the enclosed filter disc media or membrane and provide complete and unobstructed access to the entire filer disc media or membrane. This enables a user to remove the filter disc media or membrane and maintain it in a horizontal orientation to prevent the loss of any particulate matter trapped on the upstream surface of the disc media or membrane. One or more tabs may be formed on, or applied to, the perimeter of the filter disc media or membrane to facilitate removal with pinching type implements, e.g., tweezers.

In an alternate embodiment of the disposable filter capsule, the upper capsule half is modified to secure the filter disc or membrane in the capsule. In place of an annular O-ring channel, a sloped annular surface (conical in cross-section) extends downwardly from the bottom surface of the upper capsule half perimeter edge to form an apical ring to register against the filter disc or membrane. A smaller diameter O-ring (smaller relative to the large O-ring of the prior embodiment), is pressed between the sloping shoulder of the upper capsule half and the inner wall of the perimeter shoulder of the lower capsule half. In a further alternate embodiment, an annular ring extending upwardly from an upper surface of the lower capsule half is formed radially inwardly of the perimeter shoulder to function as a registration surface to secure the filter disc media or membrane between the ring and the lower surface of the upper capsule half. The disc media or membrane is compressed between the registration surfaces to create a fluid-tight seal. The filter disc media or membrane may be sonically welded to the ring.

In a yet further aspect of the disclosure, a disposable filter capsule assembly is formed from two capsule halves formed with corresponding snap-fit features to secure the halves together in a releasable configuration. A bottom capsule half is formed with a perimeter shoulder having a plurality of slots dimensioned to receive locking tabs. A filter-disc-receiving surface formed on the lower capsule half has an annular surface formed radially inwardly from the perimeter shoulder to support the perimeter edge of the filter disc.

A top capsule half is formed with a plurality of locking tabs dimensioned to slide into the slots. The locking tabs each may be formed with a detent at a distal end to prevent undesired retraction of the tab from the slot. An annular ring extending downwardly from an interior surface of the top capsule half is formed radially inwardly from the perimeter edge of the capsule half so as to form a gap between the annular ring and the inner wall of the lower capsule half shoulder. An O-ring is secured in the gap to create a fluid tight seal. The registration of the annular ring against the filter disc compresses the perimeter edge of the disc against the annular surface of the lower capsule half to secure the disc in the capsule assembly. The capsule halves are separated by applying opposing forces on the inlet and outlet ports formed on the upper and lower capsule halves, respectively. The perimeter shoulder of the lower capsule half is sufficiently short to permit easy access to the enclosed filter disc or membrane. As with other aspects and embodiments of the disclosure, one or more tabs may be formed on, or secured to, the perimeter of the filter disc media or membrane to facilitate removal with pinching implements.

In an alternate embodiment, a disposable filter capsule is formed with luer lock port constructions to permit the capsule to be secured to different devices for different applications, e.g., syringes with luer lock connection features. The inlet port is formed as either a male or female luer lock connection and the outlet port is formed with the corresponding opposite luer lock connection. Alternatively, both ports may be formed with the same male or female luer lock configuration. These port configurations may also take the form of barbed ports to receive soft tube attachments. To release the luer lock port connections, the accessory component secured to the luer port is torqued off the port. To separate the capsule halves, the ports are grasped and pulled apart with sufficient force to disengage the locking tabs. The filter disc or membrane can then be removed and maintained in a substantially horizontal orientation to maximize particulate recovery.

In yet another aspect of the disclosure, a disposable filter capsule is formed with adjustable locking tabs to permit variation of the capsule chamber depth. An upper capsule half is formed with a plurality of downwardly extending locking tabs with each tab having a plurality of locking tips dimensioned to be secured to a lower capsule half. The upper capsule half has a perimeter shoulder extending downwardly from the top surface of the capsule half so as to define an upstream filter chamber. The shoulder is formed about the perimeter radially inwardly from the locking tabs to form a continuous shoulder. An annular channel is formed on the distal end of the shoulder defined by a secondary annular shoulder on the radial inner side of the channel. The channel is dimensioned to correspond to a channel formed in a shoulder of the lower capsule half.

The lower capsule half is formed with a plurality of slots dimensioned and spaced to correspond to the dimensions and spacing of the locking tabs. A lower capsule half shoulder extends upwardly from the lower capsule half bottom surface to define the downstream segment of the capsule chamber and part of the upstream capsule chamber that combination, form a single chamber divided by the enclosed filter disc media or membrane. An inner secondary annular channel is formed on the distal end of the lower capsule shoulder and defined by a secondary shoulder on the radial outer side of the secondary annular channel. The dimensions of the secondary channel and shoulder correspond to the upper capsule shoulder and secondary channel to interlock when the capsule halves are joined together. The distal end of the upper capsule shoulder registers against the outer perimeter of the enclosed filter disc or membrane and compresses it against the annular filter-disc-receiving channel of the lower capsule half. A gap may be formed between the outer wall of the upper channel and the inner wall of the lower channel to receive an O-ring to create a fluid-tight seal. The filter disc or membrane is placed on the disc support channel or filter disc seat in the lower capsule half before the capsule sections are joined together.

To connect the capsule halves, the locking tabs of the upper capsule half are aligned with the slots in the lower capsule half. Opposing pressure is applied to the halves to urge the halves together. The locking tabs compress and slide through the slots and are urged through the slots until the corresponding shoulders of the halves register against one another. The presence of the O-ring ensures a fluid-tight seal. The capsule halves may include luer lock ports, or may be fitted or formed with barbed ports or any port construction, e.g., tri-clamp flanges, provided the port is in fluid communication with the capsule chamber.

In a yet further aspect of the disclosure, a disposable filter capsule assembly includes capsule halves with corresponding luer lock features to secure the halves together. A lower capsule half or segment is formed with an annular lower perimeter shoulder extending upwardly from a bottom surface of the segment to partially define a filter capsule chamber. A plurality of slots are formed in the perimeter shoulder to receive locking tabs. A lower slip seal shoulder is formed radially inwardly from the perimeter shoulder and extends upwardly from the lower capsule segment.

An upper capsule half or segment is formed with a plurality of locking tabs extending radially outwardly from an annular upper surface of the capsule half. The locking tabs are dimensioned to fit within the slots of the lower capsule half. The locking tabs may be formed with detents to releasably lock the tabs in the slots. An upper slip seal shoulder is formed radially inwardly from the perimeter of the upper capsule half and dimensioned to fit within a gap formed between the lower slip seal shoulder and the lower capsule perimeter shoulder. The upper slip seal shoulder registers against the enclosed filter disc and compresses it against a filter disc annular seat. The upper and lower slip seal shoulder surfaces register against one another and form a fluid-tight seal. An O-ring is not needed to create a fluid-tight seal with this embodiment. Luer lock ports may be formed on each capsule half and may be constructed as male and/or female configurations.

In a further aspect of the disclosure, a disposable filter capsule includes slip seal surfaces with ratcheting locking tabs to releasably lock the capsule halves together. An upper capsule segment has a plurality of locking tabs formed with one or more locking teeth. An annular upper slip seal shoulder extends downwardly from the capsule segment radially inwardly of the locking tabs. An inlet port extends upwardly from the capsule segment and may include luer lock features.

A lower capsule segment has a dual lower slip seal shoulder extending upwardly and dimensioned to correspond and be secured to the upper slip seal shoulder. A plurality of locking tab slots are formed on the perimeter of the lower capsule segment to receive the locking tabs of the upper capsule segment. The slots are arranged, dimensioned and numbered to correspond to the dimensions and number of locking tabs.

A filter media disc or membrane is placed in the lower capsule segment on an annular surface formed radially inwardly of the lower slip seal shoulder to receive the filter disc. The upper capsule segment is placed over the lower segment and forced down onto the lower segment to engage the mating surfaces of the slip seal shoulders. A portion of the upper shoulder registers against the perimeter of the filter media disc or membrane and compresses the disc or membrane perimeter against the annular surface to secure the disc or membrane in the capsule. The slip seal surfaces of the upper and lower shoulders, when in registration, form a fluid-tight seal.

In a still further aspect of the disclosure, a disposable or single-use media holder includes an upper shell segment and a lower shell segment secured together with a set of spot welds. The upper shell segment has annular corresponding tongue and groove shoulder surfaces to create a liquid tight seal. An annular hold down ridge is formed radially inwardly of the shoulder surfaces to function as a barrier to loose filter media. A series of tabs are formed radially extended from the shell segments to provide a means to pry the segments apart at the spot weld points. The tabs are formed on each segment at the points where a spot weld is made. The aligned tabs provide a registration surface to apply a prying instrument to separate the segments and expose the loose filter media. An inlet port is formed on the upper segment and an outlet port is formed on the lower segment.

In another aspect of the disclosure, the ports of the capsule embodiments disclosed herein may be formed illustratively as integral or modular barbed fittings and as integral or modular luer lock fittings with alternating male and female parings to permit multiple capsules to be joined in a stackable configuration. Each port may be configured as either a male or female fitting to accommodate a variety of connection configurations and requirements. As a further alternative, the ports may be formed with flanges for connection to tubes or a larger apparatus with a tri-clamp or like clamping feature. These and other aspects of the disclosure will become apparent from a review of the appended drawings and a reading of the following detailed description of the disclosure.

BRIEF DESCRIPTION OF THE DRAWINGS

FIG. 1 is a side sectional view in elevation of a filter cup/filter stem assembly according to one embodiment of the disclosure.

FIG. 2 is an exploded top side perspective view of the filter cup/filter stem assembly shown in FIG. 1.

DETAILED DESCRIPTION OF THE DISCLOSURE

Figure 3:
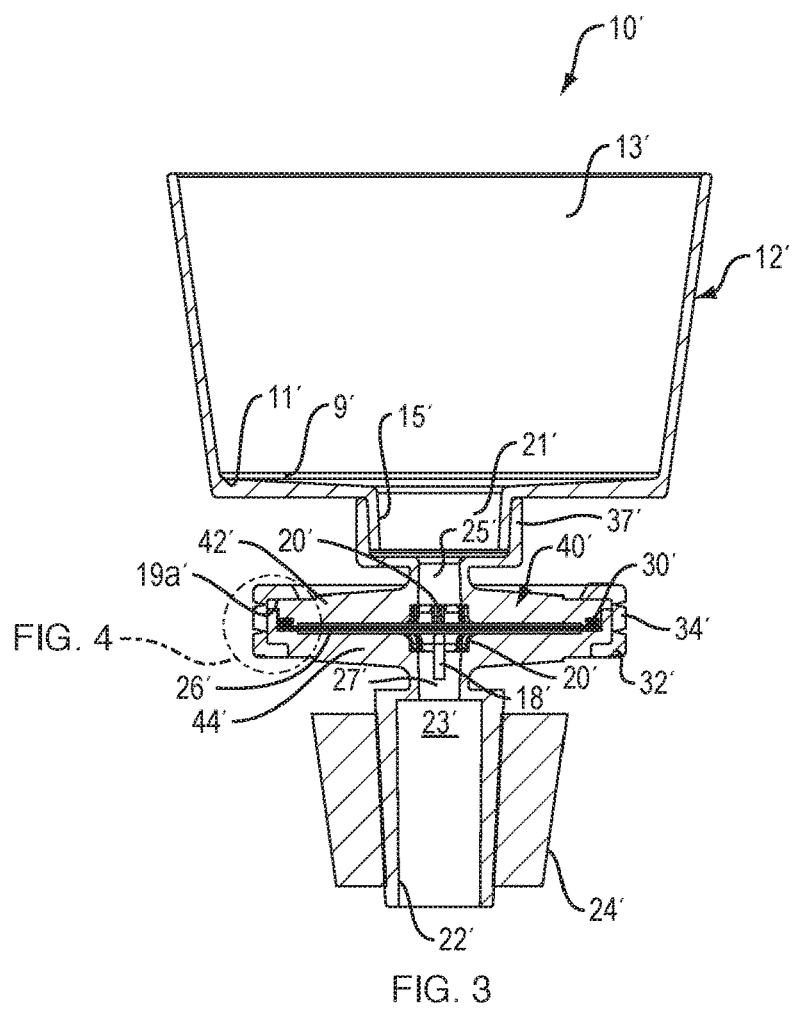
FIG. 3 is a side sectional view in elevation of a filter cup/filter stem assembly with an O-ring seal having an "x" cross-sectional shape according to one embodiment of the disclosure.

Referring to FIGS. 1 and 2, in one aspect of the disclosure, a filter cup/filter stem assembly is shown designated generally as 10. Cup assembly 10 includes a tapered cylindrical cup body designated generally as 12 that defines a fluid chamber 13 dimensioned to receive fluid for processing. It should be understood that the cup body does not have to be tapered and may be formed with a variety of cross-sectional shapes that define chamber 13. Cup body 12 is secured to a filter stem, designated generally as 14, that includes an annular filter support surface 16, a cross beam 18 that extends across the inner diameter of support surface 16 and a plurality of ribs 20 spaced around cross beam 18 that extend radially inwardly from the inner diameter of support surface 16 to a perimeter of a stem bore 25 disclosed in more detail below.

An annular shoulder 17 extends upwardly from the perimeter of support surface 16 and is dimensioned to receive a filter disc 26. Shoulder 17 prevents lateral displacement of the enclosed filter disc. As used herein, the term "upwardly" shall define a directional orientation of a component extending opposite the gravitational direction of flow of fluids through the disclosed filter assemblies. The term "downwardly" shall define a directional orientation of a component extending toward, or in the same direction as the gravitational direction of flow of fluids through the disclosed filter assemblies.

An annular recess 19 formed about a bottom perimeter edge of support surface 16 provides a mechanically lockable registration surface for portions of filter cup 12 when joined to filter stem 14. It should be understood that filter stem 14 may be formed without recess 19 and may be secured to the filter cup using other connections means such as, illustratively, a cup locking strip (disclosed in more detail herein), dimensioned to account for the absence of recess 19.

Formed at, or attached to, a bottom end of filter cup 12 is a frangible filter cup detachment strip 32 with portions defining an annular bottom lip 33 that extends radially inwardly from an outer perimeter of the strip and is dimensioned to fit within recess 19. For embodiments without recess 19, lip 33 is dimensioned to register against the bottom perimeter edge of support surface 16. An inner wall of strip 32 has a cross-sectional diameter dimensioned to fit around, and register against, an outer surface of shoulder 17. A top edge of shoulder 17 registers against a bottom end of filter cup 12, or a top end of detachment strip 32. When secured about, and registered against, the side and/or top of shoulder 17 and registered against recess 19, (or the bottom surface of support surface 16), strip 32 locks filter cup 12 to filter stem 14 and prevents lateral and axial displacement of the filter stem from the filter cup.

Frangible strip 32 includes a removable pull strip 34 that extends around at least a substantial portion of the perimeter of strip 32. A pair of grooves 35, which may be substantially parallel, are formed in strip 32 and define the lateral edges of pull strip 34. Grooves 35 reduce the thickness of strip 32 and pull strip 34 and provide a structural weak point in the construction of strip 32. These annular weakened sections facilitate separation of pull strip 34 from frangible strip 32 and reduce the amount of force needed to permit pull strip 34 to be detached from frangible strip 32. Separation is effectuated by tearing the material that forms and defines the valley of grooves 35. The thickness of the grooves may be set so that the amount of force needed to separate pull strip 34 from frangible strip 32 can be generated manually without mechanical assistance. The cross-sectional shape of grooves 35 may be in the form of a "v," "u," "square u," or any other shape that reduces the thickness of strip 34.

In an alternative embodiment, annular grooves 35 may be formed with two or more regions having different thicknesses to mimic the structure of a zipper. The differently dimensioned sections or regions are formed in an alternating, or variable pattern (when more than two thicknesses are used) to create zones of varying structural weakness that facilitate and ease detachment of the pull strip via hand or machine pressure. In a further alternative embodiment, grooves 35 are formed with a plurality of perforations that reduce the volume of material that form the grooves to further reduce the force needed to separate pull strip 34 from frangible strip 32.

Filter stem 14 has an outlet 22 that extends downwardly from support surface 16. Outlet 22 defines a downstream chamber 23 ultimately in fluid communication with fluid chamber 13. A stem bore 25 is formed in stem 14 above chamber 23 and is in fluid communication with chamber 23 and with fluid chamber 13. Gaps between ribs 20 permit fluids exiting filter disc 26 to flow through bore 25 and into downstream chamber 23.

An O-ring 30 is positioned over the perimeter of filter disc 26 and dimensioned to be compressed within the perimeter of shoulder 17 to create a seal between filter stem 14 and filter cup body 12. O-ring 30 also improves the seal between filter disc 26 and the features of cup body 12 and filter stem 14 that register against the filter disc. A stopper 24 made from rubber or other suitable elastomeric material and having portions defining a stem receiving through-bore is secured about outlet 22. This permits filter cup/filter stem assembly 10 to be secured and sealed to a fluid receiving vessel such as a flask. If a vacuum port and vacuum source is provided in either filter stem 14 or an attached fluid receiving vessel, the optional use of vacuum pressure in the filter system is made possible to enhance the filtration process according to methods commonly used in the art.

Filter disc media or membrane 26 may be formed from any conventional materials used to construct filter discs including those disclosed below. Filter disc media or membrane 26 may be formed in any regular or irregular geometric shape and may include a pull tab 28 to facilitate removal of the filter disc after filtration. Alternatively, multiple pull tabs 28 may be incorporated into the filter disc.

The post filtration steps to retrieve the filter disc media or membrane include tearing pull strip 34 from frangible strip 32 to disengage cup 12 from stem 14. Cup 12 is then lifted off stem 14. The positioning of pull strip 34 substantially coplanar with filter disc media or membrane 26 permits easy access to the exposed disc as it remains positioned on stem 14. The complete separation of the filter cup from the filter stem at their junction causes a top surface of filter disc 26 to be completely exposed and unencumbered. Moreover, because disc 26 is completely exposed, disc 26 may be maintained in a substantially horizontal orientation from its resting place on support surface 16 before and during removal so as to maximize filtrate capture. Support surface 16 and shoulder 17 ensure the disc remains in situ and horizontal during the pull strip removal step until the disc is removed deliberately.

Pull tab 28 provides a surface to selectively grasp the filter disc with fingers, or with an implement, e.g., pliers, tweezers, forceps, etc. to facilitate removal of the disc from the filter stem without compromising the horizontal orientation of the disc media or membrane. It should be understood that the one or more pull tabs formed on, or secured to, the filter disc media or membrane may be formed with any regular or irregular geometric shape and be oriented to extend above or below the plane occupied by the disc at any angle relative to the disc plane and remain within the scope and spirit of the disclosure.

Figure 4:
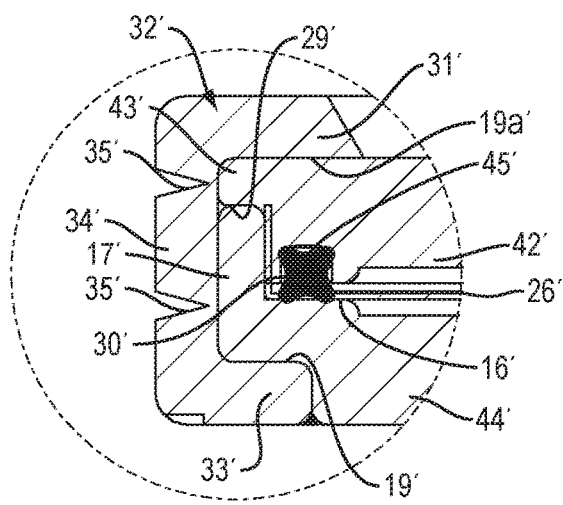
FIG. 4 is an enlarged partial view in cross-section of the O-ring seal of the filter cup/filter stem assembly shown in FIG. 3.

Referring now to FIGS. 3 and 4, in another aspect of the disclosure, a filter cup/filter stem assembly shown designated generally as 10' includes a hybrid filter stem/filter securing capsule shown designated generally as 40'. As used herein, elements referenced by differently primed or unprimed reference characters correspond to different embodiments of the same element. As shown in FIG. 3, a filter cup 12' defines a fluid receiving cavity 13'. Extending downwardly from a bottom of filter cup 12' is an annular stem receiving port 15'. It should be understood that port 15' may define any regular or irregular geometric shape in cross-section. Port 15' defines a fluid transition cavity 21' in fluid communication with fluid receiving cavity 13'. An annular disc support shoulder 11' formed at the bottom of cavity 13' and about a top end of port 15' may be used to hold one or more optional pre-filters 9'. Shoulder 11' may be sloped toward cavity 13' to direct fluid flow to cavity 13'.

Filter securing capsule 40' is constructed from two segments: a top housing segment 42', and a hybrid filter stem/bottom housing 44'. Top housing 42' is formed with a substantially planar annular perimeter base 41' that defines a centralized cavity on a bottom side of the housing segment to receive a filter disc media or membrane 26'. Base 41' permits registration against a corresponding surface of bottom housing 44' disclosed in more detail below. Base 41' also provides a registration surface for a frangible lock ring 32' disclosed in more detail below. Base 41' also defines an annular perimeter shoulder 43' that registers against a top surface 29' of a bottom housing perimeter shoulder 17' disclosed in more detail below.

Top housing 42' is further formed with a cup receiving port 37' that extends upwardly from an upper surface of the housing segment and is substantially cylindrical with an inner diameter dimensioned to receive an outer wall of port 15'. An upper stem through-bore 25' is formed in top housing 42' and is in fluid communication with fluid chamber 13', fluid transition cavity 21' and a downstream chamber 23' disclosed in more detail below. It should be understood that cup receiving port 37' may define in cross-section, any regular or irregular geometric shape provided the cross-sectional shape corresponds to the cross-sectional shape of port 15'.

Alternatively, top housing 42' may be formed with many of the same features as filter stem 14. Top housing 42' may have an annular filter receiving surface facing downwardly (instead of upwardly like surface 16), with a perimeter shoulder extending downwardly from a bottom surface of the housing segment. A cross beam may extend across the inner diameter of support surface and a plurality of spaced ribs 20' (shown in FIG. 3) may be included that extend radially inwardly from the inner diameter of support surface to a perimeter of upper stem through-bore 25'. The annular shoulder is dimensioned to receive filter disc 26'. Like shoulder 17 of FIG. 2, the shoulder prevents lateral displacement of an enclosed filter disc within top housing 42'. An annular recess may be formed about a top perimeter edge of the support surface to provide a mechanically locking registration surface for frangible locking ring 32' to secure top housing 42' to bottom housing 44'. The embodiment shown in FIGS. 3 and 4 does not include such a recess.

Filter stem/bottom housing 44' has substantially the same features as disclosed for filter stem 14. Filter stem 44' has an annular filter support surface 16', a cross beam 18' that extends across the inner diameter of support surface 16' and a plurality of spaced ribs 20' that extend radially inwardly from the inner diameter of support surface 16' to a perimeter of a lower stem through-bore 27'. An annular shoulder 17' extends upwardly from the perimeter of support surface 16' and is dimensioned to receive filter disc 26'. Shoulder 17' prevents lateral displacement of an enclosed filter disc. An annular recess 19' may be formed about a bottom perimeter edge of support surface 16' to provide a mechanically lockable registration surface for the frangible locking ring to secure top housing 42' to bottom housing 44'. The embodiment shown in FIGS. 3 and 4 includes recess 19'.

Filter stem/bottom housing 44' further has an outlet 22' that extends downwardly from support surface 16'. Outlet 22' defines a downstream chamber 23' ultimately in fluid communication with fluid chamber 13'. Lower stem through-bore 27' is formed in stem 44' above chamber 23' and is in fluid communication with chamber 23', upper stem through-bore 25' and ultimately, fluid chamber 13'. The gaps between spaced ribs 20' permit fluids exiting filter disc 26' to flow through lower stem through-bore 27' and into downstream chamber 23'.

Like assembly 10, assembly 10' has an O-ring 30' to create a fluid-tight seal. An annular O-ring channel 45' is formed inside the perimeter of the bottom surface of top housing 42' and dimensioned to receive O-ring 30'. A bottom-facing surface of O-ring 30' registers against a top surface of filter disc 26' and is compressed when the two housing segments are assembled and secured with frangible lock ring 32'. As shown in FIG. 4, O-ring 30' has an "x" shape profile in cross section to provide two annular sealing surfaces when compressed against filter disc 26'.

Like assembly 10, a stopper 24' made from rubber or other suitable elastomeric material and having portions defining a stem receiving through-bore may be secured about outlet 22'. This permits filter cup/filter stem assembly 10' to be secured and sealed to a fluid receiving vessel such as a flask and permit the application of vacuum pressure as previously described for assembly 10, if required or desired.

Frangible lock ring 32' has portions defining an annular bottom lip 33' that extends radially inwardly from an outer perimeter of the strip and is dimensioned to fit within recess 19'. For embodiments without recess 19', lip 33' is dimensioned to register against the bottom perimeter edge of support surface 16'. An inner wall of strip 32' has a cross-sectional diameter dimensioned to fit around, and register against, an outer surface of shoulder 17'.

Lock ring 32' also has portions defining an annular top lip 31' that extends radially inwardly from an outer perimeter of the strip and is dimensioned to register against a top surface of top housing 42'. Top housing 42' may also be formed with a top annular recess 19a' dimensioned to receive top lip 31' (as shown in FIG. 4). With this construction, locking ring 32' is superposed about, and registered against, the registration surfaces of top housing 42' and stem 44' so as to secure the housing and stem segments together and prevent lateral and axial displacement of upper housing 42' from stem 44'.

Frangible strip 32' includes a removable pull strip 34' that extends around at least a substantial portion of the perimeter of strip 32'. A pair of grooves 35' that may be substantially parallel are formed in strip 32' and define the lateral edges of pull strip 34'. Grooves 35' reduce the thickness of strip 32' and provide a structural weak point in the construction of strip 32'. These annular weakened sections reduce the amount of force needed to permit pull strip 34' to be detached from strip 32' by tearing the material that forms and defines the valley or grooves 35'. Like grooves 35, the cross-sectional shape of grooves 35' may be in the form of a "v," "u," "square u," or any other shape that reduces the thickness of the junction between frangible strip 32' and pull strip 34.

In an alternative embodiment, annular grooves 35 may be formed with two or more regions having different thicknesses to mimic the structure of a zipper. The differently dimensioned sections or regions are formed in an alternating, or variable pattern (when more than two thicknesses are used) to create zones of varying structural weakness that facilitate and ease detachment of the pull strip via hand or machine pressure. In a further alternative embodiment, grooves 35' are formed with a plurality of perforations that further reduce the amount of material that make up the grooves and thus, the force needed to separate pull strip 34' from frangible strip 32'.

Figure 5:
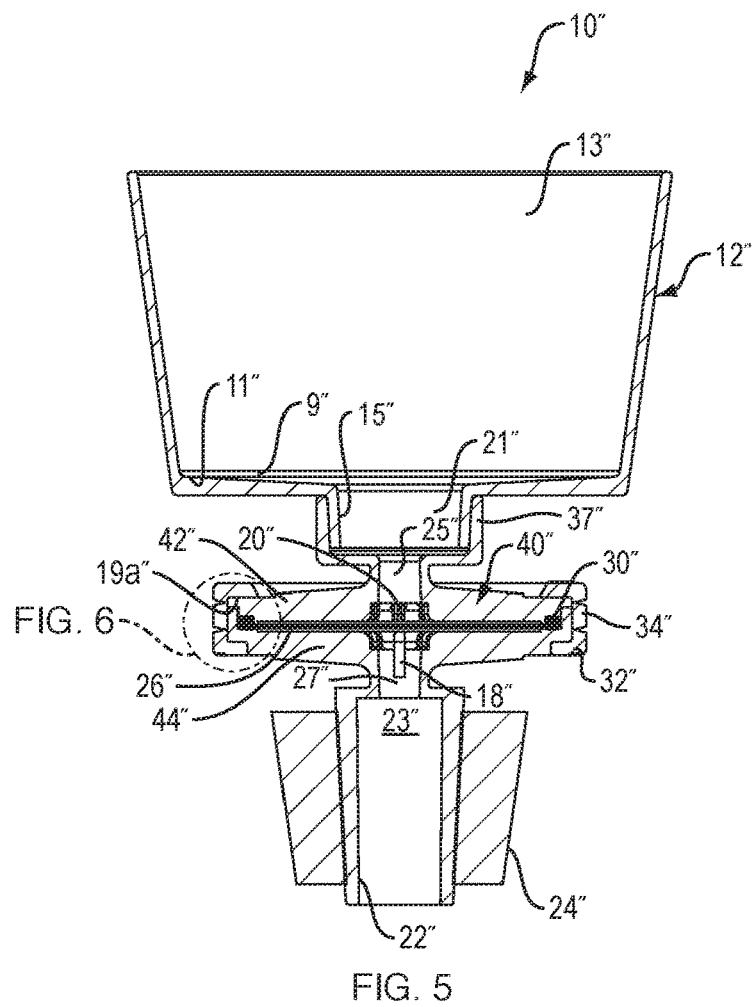
FIG. 5 is a side sectional view in elevation of a filter cup/filter stem assembly with an O-ring seal having a square cross-sectional shape according to another embodiment of the disclosure.
Figure 6:
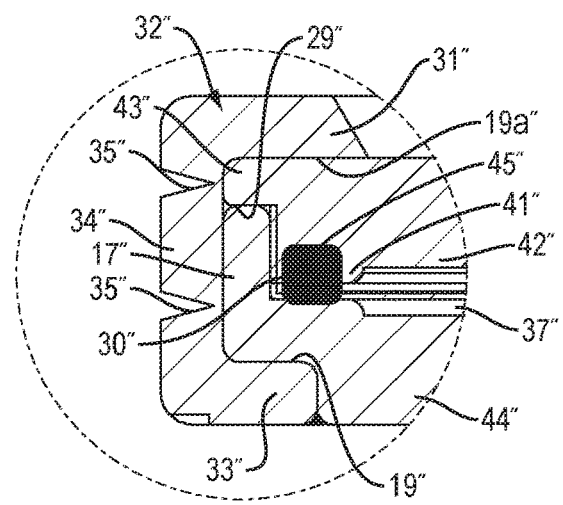
FIG. 6 is an enlarged partial view in cross-section of the O-ring seal of the filter cup/filter stem assembly shown in FIG. 5.

Referring now to FIGS. 5 and 6, in another embodiment of the disclosure, a filter cup/stem assembly designated generally as 10" has the same features as filter cup/stem assembly 10' except an O-ring 30", having a square or rectangular shape in cross-section, is substituted for O-ring 30'. This O-ring provides a relatively wide profile, single annular radially extending seal surface with a larger continuous seal than what is provided by O-ring 30' when measured across its width.

As shown in FIG. 5, a filter cup 12" defines a fluid receiving cavity 13". Extending downwardly from a bottom of filter cup 12" is an annular stem receiving port 15". It should be understood that port 15" may define any regular or irregular geometric shape in cross-section. Port 15" defines a fluid transition cavity 21" in fluid communication with fluid receiving cavity 13". An annular disc support shoulder 11" formed at the bottom of cavity 13" and about a top end of port 15" may be used to hold one or more optional pre-filters 9". Shoulder 11" may be sloped toward cavity 13" to direct fluid flow to cavity 13".

Filter securing capsule 40" is constructed from two segments, a top housing 42" and a hybrid filter stem/bottom housing 44". Top housing 42" is formed with a substantially planar annular perimeter base 41" that defines a centralized cavity on a bottom side of the housing segment to receive a filter disc 26". Base 41" permits registration against a corresponding surface of bottom housing 44" disclosed in more detail below. Base 41" also provides a registration surface for a frangible lock ring 32" disclosed in more detail below. Base 41" also defines an annular perimeter shoulder 43" that registers against a top surface 29" of a bottom housing perimeter shoulder 17" disclosed in more detail below.

Top housing 42" is further formed with a cup receiving port 37" that extends upwardly from an upper surface of the housing segment and is substantially cylindrical with an inner diameter dimensioned to receive an outer wall of port 15". An upper stem through-bore 25" is formed in top housing 42" and is in fluid communication with fluid chamber 13", fluid transition cavity 21" and a downstream chamber 23" disclosed in more detail below. It should be understood that cup receiving port 37" may define in cross-section, any regular or irregular geometric shape provided the cross-sectional shape corresponds to the cross-sectional shape of port 15". It should also be understood that the relative dimensions of ports 15" and 37" may be reversed so that the inner diameter of port 15" registers against an outer diameter of port 37".

Alternatively, top housing 42" may be formed with many of the same features as filter stem 14 and 14'. Top housing 42" may have an annular filter receiving surface facing downwardly (instead of upwardly like surface 16), with a perimeter shoulder extending downwardly from a bottom surface of the housing segment. A cross beam may extend across the inner diameter of support surface and a plurality of spaced ribs 20" (shown in FIG. 5) may be included that extend radially inwardly from the inner diameter of support surface to a perimeter of upper stem through-bore 25". The annular shoulder is dimensioned to receive filter disc media or membrane 26". The shoulder prevents lateral displacement of an enclosed filter disc. An optional annular recess 19a" (shown in FIG. 6) may be formed about a top perimeter edge of support surface to provide a mechanically lockable registration surface for frangible locking ring 32" to secure top housing 42" to bottom housing 44".

Filter stem/bottom housing 44" has substantially the same features as those disclosed for filter stem 14 and bottom housing 44'. Filter stem 44" has an annular filter support surface 16", a cross beam 18" that extends across the inner diameter of support surface 16" and a plurality of spaced ribs 20" that extend radially inwardly from the inner diameter of support surface 16" to a perimeter of a lower stem through-bore 27". An annular shoulder 17" extends upwardly from the perimeter of support surface 16" and is dimensioned to receive filter disc 26". Shoulder 17" prevents lateral displacement of an enclosed filter disc. An annular recess 19" may be formed about a bottom perimeter edge of support surface 16" to provide a mechanically lockable registration surface for the frangible locking ring to secure top housing 42" to bottom housing 44". The embodiment shown in FIGS. 5 and 6 includes recess 19".

Filter stem/bottom housing 44" further has an outlet 22" that extends downwardly from support surface 16". Outlet 22" defines a downstream chamber 23" ultimately in fluid communication with fluid chamber 13". Lower stem through-bore 27" is formed in stem 44" above chamber 23" and is in fluid communication with chamber 23", upper stem through-bore 25" and ultimately, fluid chamber 13". The gaps between spaced ribs 20" permit fluids exiting filter disc 26" to flow through lower stem through-bore 27" and into downstream chamber 23".

Like assemblies 10 and 10', assembly 10" has an O-ring 30" to create a fluid-tight seal. An annular O-ring channel 45" is formed inside the perimeter of the bottom surface of top housing 42" and dimensioned to receive O-ring 30". A bottom-facing surface of O-ring 30" registers against a top surface of filter disc 26" and is compressed when the two housing segments are assembled and secured with frangible lock ring 32". As previously stated and as shown in FIG. 6, O-ring 30" has a square or rectangular shape profile in cross section to provide a wider radially extending sealing surface than O-ring 30' when compressed against filter disc 26".

Like assemblies 10 and 10', a stopper 24" made from rubber or other suitable elastomeric material and having portions defining a stem receiving through-bore may be secured about outlet 22". This permits filter cup/filter stem assembly 10" to be secured and sealed to a fluid receiving vessel such as a flask. Similar to the other embodiments, vacuum pressure may be applied to urge fluids through the filter assembly due to the airtight seal provided by stopper 24".

Like frangible lock ring 32', frangible lock ring 32" has portions defining an annular bottom lip 33" that extends radially inwardly from an outer perimeter of the strip and is dimensioned to fit within recess 19". For embodiments without recess 19", lip 33" is dimensioned to register against the bottom perimeter edge of support surface 16". An inner wall of strip 32" has a cross-sectional diameter dimensioned to fit around, and register against, an outer surface of shoulder 17".

Lock ring 32" also has portions defining an annular top lip 31" that extends radially inwardly from an outer perimeter of the strip and is dimensioned to register against a top surface of top housing 42". Top housing 42" may also be formed with a top annular recess 19a" dimensioned to receive top lip 31" (as shown in FIG. 6). With this construction, locking ring 32" is superposed about, and registered against, the registration surfaces of top housing 42" and stem 44" so as to secure them together and prevent lateral and axial displacement of upper housing 42" from stem 44".

Frangible strip 32" also includes a removable pull strip 34" that extends around at least a substantial portion of the perimeter of strip 32". A pair of grooves 35" that may be substantially parallel are formed in strip 32" and define the lateral edges of pull strip 34". Grooves 35" reduce the thickness of strip 32" and provide a structural weak point in the construction of strip 32". These annular weakened sections reduce the amount of force needed to permit pull strip 34" to be detached from frangible strip 32" by tearing the material that forms and defines the valley or grooves 35". Like grooves 35', the cross-sectional shape of grooves 35" may be in the form of a "v," "u," "square u," or any other shape that reduces the thickness of strip 34".

In an alternative embodiment, annular grooves 35 may be formed with two or more regions having different thicknesses to mimic the structure of a zipper. The differently dimensioned sections or regions are formed in an alternating, or variable pattern (when more than two thicknesses are used) to create zones of varying structural weakness that facilitate and ease detachment of the pull strip via hand or machine pressure. In a further alternative embodiment, grooves 35" are formed with a plurality of perforations that further reduce the amount of material that make up the grooves and thus, the force needed to separate pull strip 34" from frangible strip 32".

Figure 7:
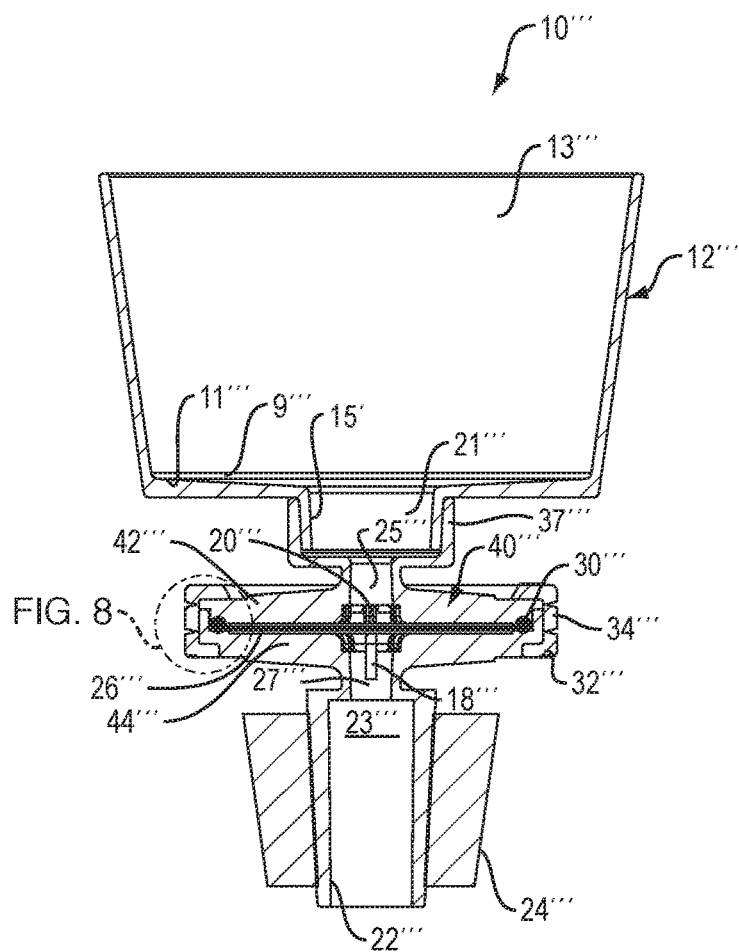
FIG. 7 is a side sectional view in elevation of a filter cup/filter stem assembly with an O-ring seal having a round cross-sectional shape according to yet another embodiment of the disclosure.
Figure 8:
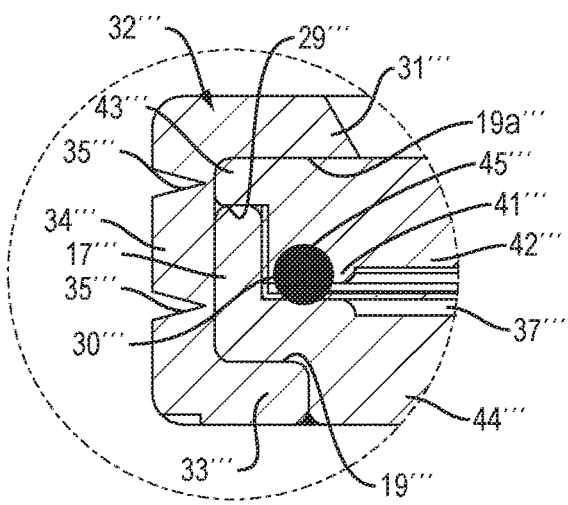
FIG. 8 is an enlarged partial view in cross-section of the O-ring seal of the filter cup/filter stem assembly shown in FIG. 7.

Referring now to FIGS. 7 and 8, another filter cup/filter stem embodiment is shown designated generally as 10''' and differs from assemblies 10' and 10" in that it incorporates an O-ring 30''' that has a round shape in cross-section that provides a singular, more narrow sealing surface than O-rings 30' and 30". As shown in FIG. 7, a filter cup 12''' defines a fluid receiving cavity 13'''. Extending downwardly from a bottom of filter cup 12''' is an annular stem receiving port 15'''. It should be understood that port 15''' may define any regular or irregular geometric shape in cross-section. Port 15''' defines a fluid transition cavity 21''' in fluid communication with fluid receiving cavity 13'''. An annular disc support shoulder 11''' formed at the bottom of cavity 13''' and about a top end of port 15''' may be used to hold one or more pre-filters 9'''. Shoulder 11''' may be sloped toward cavity 13''' to promote fluid flow toward cavity 13'''.

Filter securing capsule 40''' is constructed from two segments: a top housing segment 42''', and a hybrid filter stem/bottom housing segment 44'''. Top housing 42''' is formed with a substantially planar annular perimeter base 41''' that defines a centralized cavity on a bottom side of the housing segment to receive a filter disc media or membrane 26'''. Base 41''' permits registration against a corresponding surface of bottom housing 44''' disclosed in more detail below. Base 41''' also provides a registration surface for a frangible lock ring 32''' disclosed in more detail below. Base 41''' further defines an annular perimeter shoulder 43''' that registers against a top surface 29''' of a bottom housing perimeter shoulder 17''' disclosed in more detail below.

Top housing segment 42''' is further formed with a cup receiving port 37''' that extends upwardly from an upper surface of the housing segment and is substantially cylindrical with an inner diameter dimensioned to receive an outer wall of port 15'''. The dimensional relationship between the two components may be reversed whereby port 15''' is dimensioned to be larger than port 37''' and have its inner wall register against the outer wall of port 37'''.

An upper stem through-bore 25''' is formed in top housing 42''' and is in fluid communication with fluid chamber 13''', fluid transition cavity 21''' and a downstream chamber 23''' disclosed in more detail below. It should be understood that cup receiving port 37''' may define in cross-section, any regular or irregular geometric shape provided the cross-sectional shape corresponds to the cross-sectional shape of port 15'''.

Alternatively, top housing 42''' may be formed with many of the same features as filter stem 14, 14' and 14''. Top housing 42''' may have an annular filter receiving surface facing downwardly (instead of upwardly like surface 16), with a perimeter shoulder extending downwardly from a bottom surface of the housing segment. A cross beam may extend across the inner diameter of the support surface and a plurality of spaced ribs 20''' (shown in FIG. 7) may be included that extend radially inwardly from the inner diameter of the support surface to a perimeter of upper stem through-bore 25'''. The annular shoulder is dimensioned to receive filter disc 26'''. The shoulder prevents lateral displacement of an enclosed filter disc. An annular recess 19a''' may be formed about a top perimeter edge of the support surface to provide a mechanically lockable registration surface for frangible locking ring 32''' to secure top housing 42''' to bottom housing 44'''. The embodiment shown in FIGS. 7 and 8 includes the recess 19a'''.

Filter stem/bottom housing 44''' has substantially the same features as disclosed for filter stem 14 and bottom housings 44' and 44''. Filter stem 44''' has an annular support filter support surface 16''', a cross beam 18''' that extends across the inner diameter of support surface 16''' and a series of spaced ribs 20''' that extend radially inwardly from the inner diameter of support surface 16''' to a perimeter of a lower stem through-bore 27'''. An annular shoulder 17''' extends upwardly from the perimeter of support surface 16''' and is dimensioned to receive filter disc 26'''. Shoulder 17''' prevents lateral displacement of an enclosed filter disc. An annular recess 19''' may be formed about a bottom perimeter edge of support surface 16''' to provide a mechanically lockable registration surface for the frangible locking ring to secure top housing 42''' to bottom housing 44'''. The embodiment shown in FIGS. 7 and 8 includes recess 19'''.

Filter stem/bottom housing 44''' further has an outlet 22''' that extends downwardly from support surface 16'''. Outlet 22''' defines a downstream chamber 23''' ultimately in fluid communication with fluid chamber 13'''. Lower stem through-bore 27''' is formed in stem 44''' above chamber 23''' and is in fluid communication with chamber 23''', upper stem through-bore 25''' and ultimately, fluid chamber 13'''. Gaps between spaced ribs 20''' permit fluids exiting filter disc 26''' to flow through lower stem through-bore 27''' and into downstream chamber 23'''.

Like assemblies 10, 10' and 10'', assembly 10''' has an O-ring 30''' to create a fluid-tight seal. An annular O-ring channel 45''' is formed inside the perimeter of the bottom surface of top housing 42''' and dimensioned to receive O-ring 30'''. A bottom-facing surface of O-ring 30''' registers against a top surface of filter disc 26''' and is compressed when the two housing segments are assembled and secured with frangible lock ring 32'''. As previously stated and as shown in FIG. 8, O-ring 30''' has a round shape profile in cross section to provide a more acute, narrow, annular radially extending sealing surface than O-rings 30' or 30'' when compressed against filter disc 26'''.

Like assemblies 10, 10' and 10'', a stopper 24''' made from rubber or other suitable elastomeric material and having portions defining a stem receiving through-bore may be secured about outlet 22'''. This permits filter cup/filter stem assembly 10''' to be secured and sealed to a fluid receiving vessel such as a flask and permit the application of vacuum pressure, if needed or warranted.

Like frangible lock rings 32' and 32'', frangible lock ring 32''' has portions defining an annular bottom lip 33''' that extends radially inwardly from an outer perimeter of the strip and is dimensioned to fit within recess 19'''. For embodiments without recess 19''', lip 33''' is dimensioned to register against the bottom perimeter edge of support surface 16'''. An inner wall of strip 32''' has a cross-sectional diameter dimensioned to fit around, and register against, an outer surface of shoulder 17'''.

Lock ring 32''' also has portions defining an annular top lip 31''' that extends radially inwardly from an outer perimeter of the strip and is dimensioned to register against a top surface of top housing 42'''. Top housing 42''' may also be formed with a top annular recess 19a''' dimensioned to receive top lip 31''' (as shown in FIG. 8). With this construction, locking ring 32''' is superposed about, and registered against, the registration surfaces of top housing 42''' and stem 44''' so as to secure them together and prevent lateral and axial displacement of upper housing 42''' from stem 44'''.

Frangible strip 32''' includes a removable pull strip 34''' that extends around at least a substantial portion of the perimeter of strip 32'''. A pair of grooves 35''' that may be substantially parallel are formed in strip 32''' and define the lateral edges of pull strip 34'''. Grooves 35''' reduce the thickness of frangible strip 32''' and provide a structural weak point in the construction of strip 32'''. These annular weakened sections reduce the amount of force needed to permit pull strip 34''' to be detached from strip 32''' by tearing the material that forms and defines the valley or grooves 35'''. Like grooves 35, the cross-sectional shape of grooves 35''' may be in the form of a "v," "u," "square u," or any other shape that reduces the thickness of the strip 34''' lateral edges.

In an alternative embodiment, annular grooves 35''' may be formed with two or more different thicknesses to mimic the structure of a zipper. In an alternative embodiment, annular grooves 35 may be formed with two or more regions having different thicknesses to mimic the structure of a zipper. The differently dimensioned sections or regions are formed in an alternating, or variable pattern (when more than two thicknesses are used) to create zones of varying structural weakness that facilitate and ease detachment of the pull strip via hand or machine pressure. In a further alternative embodiment, grooves 35''' are formed with a plurality of perforations that further reduce the amount of material that make up the grooves and thus, the force needed to separate pull strip 34''' from frangible strip 32'''.

Figure 9:
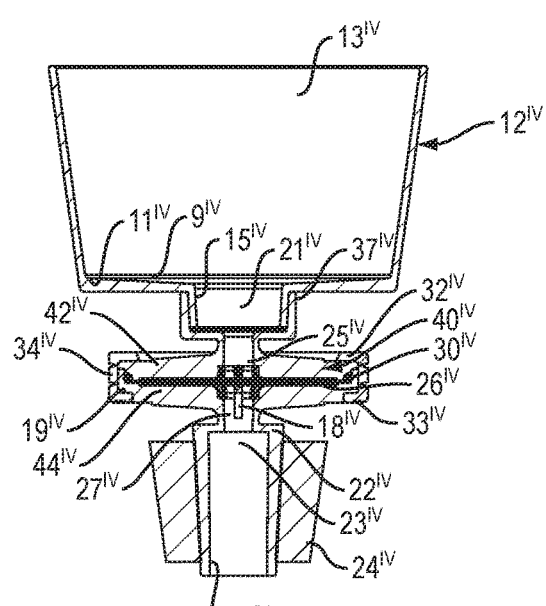
FIG. 9 is a side sectional view in elevation of a filter cup/filter stem assembly according to a further embodiment of the disclosure.
Figure 11:
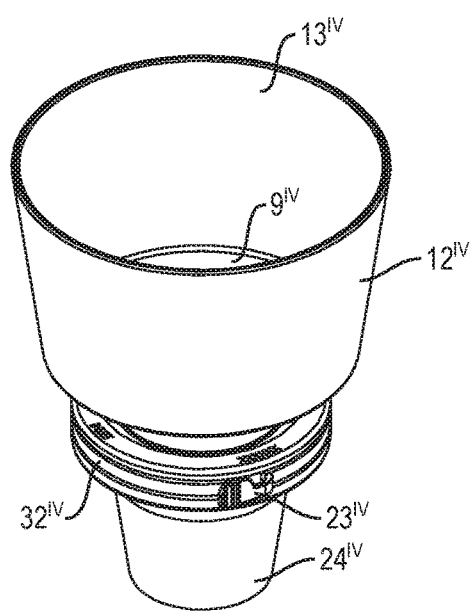
FIG. 11 is a top side perspective view of the filter cup/filter stem assembly shown in FIG. 9.
Figure 10:
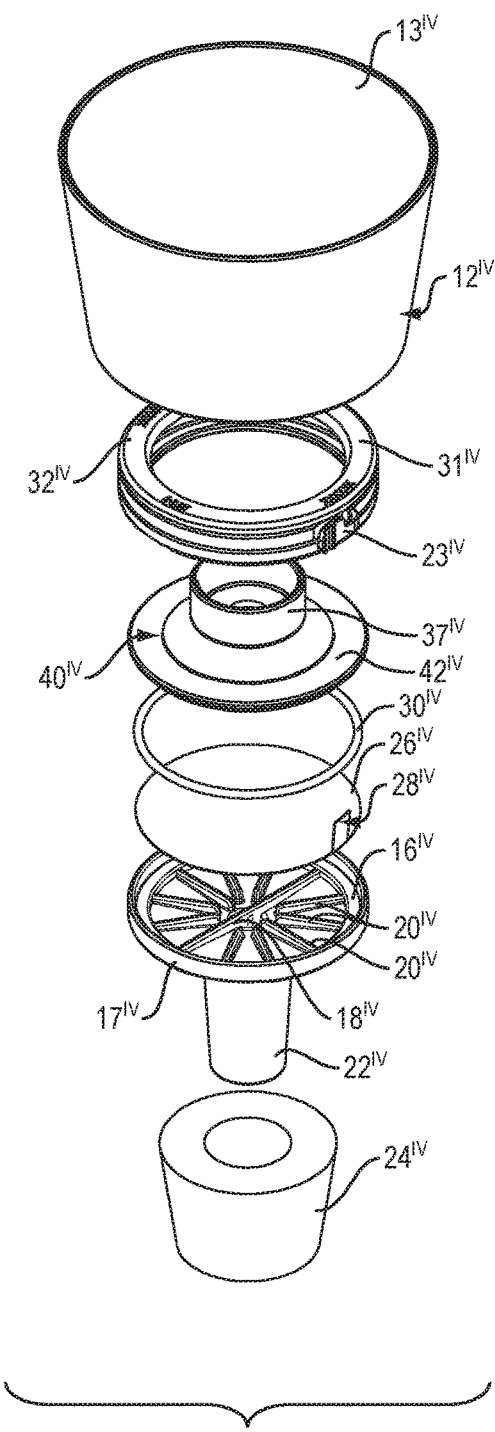
FIG. 10 is an exploded perspective view of the filter cup/filter stem assembly shown in FIG. 9.

Referring now to FIGS. 9-14, two different assembly configurations are shown for filter cup/filter stem assembly $10^{IV}$ with hybrid filter stem/filter securing capsule $40^{IV}$. As shown in FIGS. 9-11, and more particularly in the exploded view of FIG. 10, the assembly components are arranged with filter cup $12^{IV}$ (with annular filter disc support bottom $11^{IV}$ and optional pre-filter $9^{IV}$) at the top followed by lock ring $32^{IV}$, top housing segment $42^{IV}$, O-ring $30^{IV}$, filter disc $26^{IV}$, bottom housing/stem $44^{IV}$ and stopper $24^{IV}$. In this arrangement, top housing $42^{IV}$ is urged into receiving port $37^{IV}$, which is urged into registration with filter cup port $15^{IV}$ (either over or into depending upon the relative dimensions of the ports). Lock ring $32^{IV}$ is then snap fit over the perimeter of top housing segment $42^{IV}$ so that the perimeter edge of the top housing is between the top and bottom lips, $31^{IV}$ and $33^{IV}$, respectively, of lock ring $32^{IV}$. The combination of filter cup $12^{IV}$, top housing $42^{IV}$ and lock ring $32^{IV}$ form a first subassembly ready for assembly to a second subassembly disclosed below. It should be noted that filter cup $12^{IV}$ can be secured to top housing $42^{IV}$ after the assembly of top housing $42^{IV}$ and lock ring $32^{IV}$.

The remainder of the assembly can begin with the placement of filer disc $26^{IV}$ onto the filter support surface of filter stem/bottom housing $44^{IV}$. This is followed by placement of O-ring $30^{IV}$ onto the top perimeter edge of disc $26^{IV}$. Optionally, stopper $24^{IV}$ may be secured onto outlet $22^{IV}$ that extends downwardly from stem $44^{IV}$. The minimum combination of stem $44^{IV}$, disc filter $26^{IV}$ and O-ring $30^{IV}$ form a second subassembly. Stopper $24^{IV}$ may be included in this subassembly if secured to outlet $22^{IV}$.

To complete the assembly, the first subassembly is positioned about the second subassembly and lock ring $32^{IV}$ is snap fit over shoulder $17^{IV}$ of stem/bottom housing $44^{IV}$. To accomplish this, the materials used to construct lock ring $32^{IV}$ must have sufficient flexibility and material memory to permit flexion of lower lip $33^{IV}$ about shoulder $17^{IV}$. Once lip $33^{IV}$ has passed shoulder $17^{IV}$, lip $33^{IV}$ springs back to its original orientation relative to lock ring $32^{IV}$ and registers against either shoulder $19^{IV}$ (if present), or a bottom perimeter surface of stem/bottom housing $44^{IV}$. It should be understood that top lip $31^{IV}$ must also be able to flex and spring back about the perimeter of top housing $42^{IV}$ to "lock" housing $42^{IV}$ into an interior space of lock ring $32^{IV}$. In an alternative embodiment, lock ring $32^{IV}$ can be molded about the other components preassembled in a mold constructed to create the locking ring. Any of these combinations place into fluid communication fluid chamber $13^{IV}$, fluid transition cavity $21^{IV}$, upper stem through-bore $25^{IV}$, filter disc $26^{IV}$, lower stem through-bore $27^{IV}$ and downstream chamber $23^{IV}$.

Figure 12:
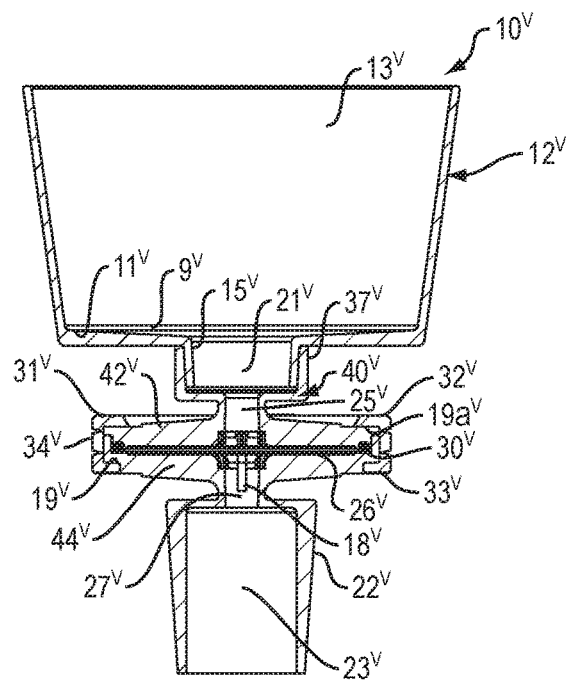
FIG. 12 is a side sectional view in elevation of a filter cup/filter stem assembly according to a still further embodiment of the disclosure.
Figure 13:
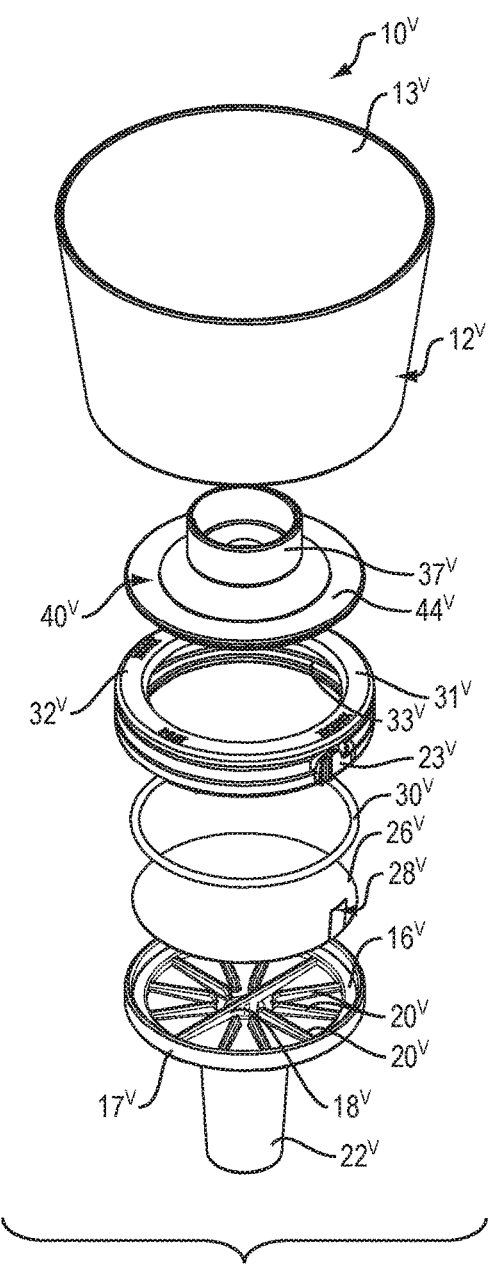
FIG. 13 is an exploded perspective view of the filter cup/filter stem assembly shown in FIG. 12.
Figure 14:
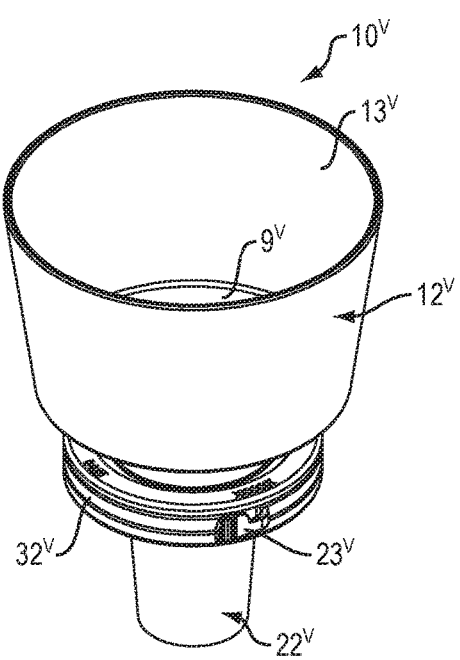
FIG. 14 is a top side perspective view of the filter cup/filter stem assembly shown in FIG. 12.

Referring now to FIGS. 12-14, a second assembly configuration is shown, particularly in FIG. 13. This embodiment has essentially the same features as the embodiment shown in FIGS. 9-11 with the exception of the differences noted below. Like features of the two embodiments are designated with the same reference character numbers, but with different superscripts, "$^{IV}$" for the embodiment shown in FIGS. 9-11 and "$^{V}$" for the embodiment shown in FIGS. 12-14. In the assembly configuration shown particularly in FIG. 13, lock ring $32^{V}$ is positioned below top housing $42^{V}$ prior to assembly. To secure lock ring $32^{V}$ to top housing $42^{V}$ in this configuration, the same method of flexing top lip $31^{V}$ about the perimeter of top housing $42^{V}$, as disclosed regarding the other assembly configuration (FIGS. 9-11), is used. As in the other assembly construction, filter cup $12^{V}$ may be assembled to top housing $42^{V}$ before or after the lock ring/top housing securing step. This results in the formation of a first subassembly for this construction.

The embodiment shown in FIGS. 12-14 also differs from the embodiment shown in FIGS. 9-11 with respect to the cross-sectional diameter of the outlet. Outlet $22^{V}$ has a much larger cross-sectional diameter than outlet $22^{IV}$. Due to the taper of outlet $22^{V}$, with the larger diameter end of the taper proximal to stem/bottom housing $44^{V}$ and the smaller diameter end distal from housing $44^{V}$, the entire filter assembly may be secured to a flask or similar container with the taper providing substantially the same sealing function as stopper $24^{IV}$ of the embodiment shown in FIGS. 9-11.

The formation of the second subassembly for this construction is identical to the formation of the second subassembly for the other disclosed construction (FIGS. 9-11). Once the second subassembly is prepared, the first subassembly is positioned over the second subassembly and the lock ring lower lip $33^{V}$ is flexed over and about the perimeter edge of stem/bottom housing $44^{V}$ to "lock" the subassemblies together to form the finished filter cup/hybrid filter stem assembly. It should be further understood that either of the two disclosed assembly configurations can be used for other filter cup/filter stem embodiments disclosed herein.

Figure 15:
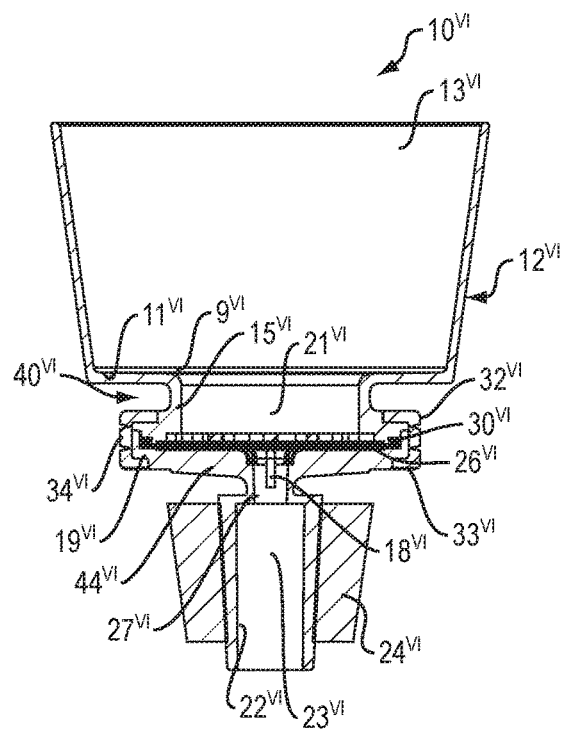
FIG. 15 is a side sectional view in elevation of a filter cup/filter stem assembly according to a yet further embodiment of the disclosure.
Figure 16:
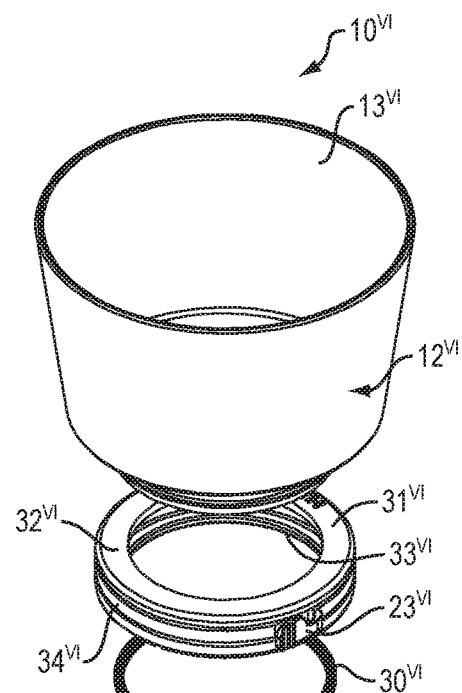
FIG. 16 is an exploded perspective view of the filter cup/filter stem assembly shown in FIG. 15.
Figure 17:
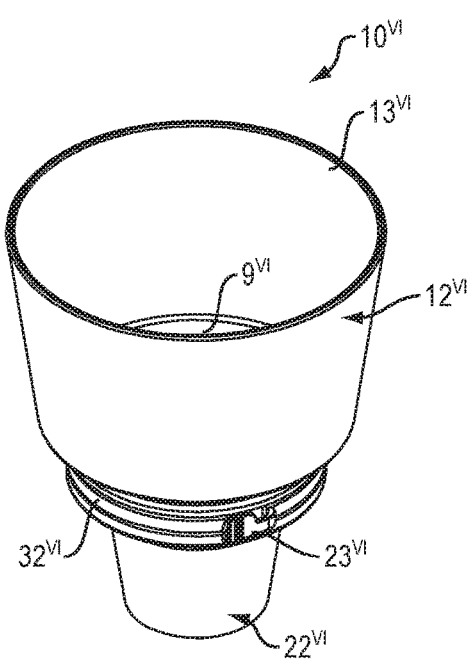
FIG. 17 is a top side perspective view of the filter cup/filter stem assembly shown in FIG. 15.

Referring now to FIGS. 15-17, in another aspect of the disclosure, a hybrid integral top filter housing/filter cup is combined with a hybrid bottom filter housing/filter stem to form a filter cup/filter stem assembly designated generally as $10^{VI}$. As shown in FIG. 15, a top housing/filter cup designated generally as $40^{VI}$ includes a filter cup $12^{IV}$ that has portions defining a fluid chamber $13^{IV}$ with an annular filter disc support bottom $11^{IV}$. An optional pre-filter $9^{VI}$ is positioned on support bottom $11^{VI}$. Extending from filter disc support bottom $11^{VI}$ of cup $12^{VI}$ is a stem receiving port $15^{VI}$ that defines a fluid transition channel $21^{VI}$ in fluid communication with fluid chamber $13^{VI}$.

A bottom end of port $15^{VI}$ extends radially outwardly to form annular top housing $42^{VI}$. A top surface of top housing $42^{VI}$ is formed with an optional top annular recess $19a^{VI}$ dimensioned to receive a portion of a lock ring $32^{VI}$ disclosed in more detail below. A bottom surface of top housing $42^{VI}$ is formed with a lower annular recess $29^{VI}$ at its perimeter to receive a top end of a shoulder $17^{IV}$ of stem/bottom housing $44^{VI}$ disclosed in more detail below. A second lower annular O-ring channel $45^{VI}$ is formed on a bottom surface of top housing $42^{VI}$ radially inwardly from lower recess $29^{VI}$ to receive an O-ring $30^{VI}$ disclosed in more detail below.

Hybrid filter stem/bottom housing $44^{VI}$ has substantially the same features as disclosed for filter stem 14 and bottom housings 44' and 44". Filter stem $44^{VI}$ has an annular support filter support surface $16^{VI}$, a cross beam $18^{VI}$ that extends across the inner diameter of support surface $16^{VI}$ and a series of spaced ribs $20^{VI}$ that extend radially inwardly from the inner diameter of support surface $16^{VI}$ to a perimeter of a lower stem through-bore $27^{VI}$. An annular shoulder $17^{VI}$, such as annular shoulder $17^{IV}$ shown in FIG. 10, extends upwardly from the perimeter of support surface $16^{VI}$ and is dimensioned to a receive filter disc $26^{VI}$. The shoulder prevents lateral displacement of an enclosed filter disc. An annular recess $19^{VI}$ may be formed about a bottom perimeter edge of support surface $16^{VI}$ to provide a mechanically lockable registration surface for the frangible locking ring to secure top housing $42^{VI}$ to bottom housing $44^{VI}$. The embodiment shown in FIG. 15 includes recess $19^{VI}$.

Filter stem/bottom housing $44^{VI}$ further has an outlet $22^{VI}$ that extends downwardly from support surface $16^{VI}$. Outlet $22^{VI}$ defines a downstream chamber $23^{VI}$ ultimately in fluid communication with fluid chamber $13^{VI}$. A stem through-bore $27^{VI}$ is formed in stem $44^{VI}$ above chamber $23^{VI}$ and is in fluid communication with chamber $23^{VI}$, fluid transition channel $21^{VI}$ and ultimately, fluid chamber $13^{VI}$. Gaps between spaced ribs $20^{VI}$ permit fluids exiting filter disc $26^{VI}$ to flow through stem bore $27^{VI}$ and into downstream chamber $23^{VI}$.

Like assemblies 10, 10' and 10", assembly $10^{VI}$ has an O-ring $30^{VI}$ to create a fluid-tight seal. An annular O-ring channel is formed inside the perimeter of the bottom surface of top housing $42^{VI}$ and dimensioned to receive O-ring $30^{VI}$. A bottom-facing surface of O-ring $30^{VI}$ registers against a top surface of filter disc $26^{VI}$ and is compressed when the two housing segments are assembled and secured with frangible lock ring $32^{VI}$. As previously stated and as shown in FIG. 8, O-ring $30^{VI}$ has a round shape profile in cross section to provide a more acute annular radially extending sealing surface than O-rings 30' or 30" when compressed against filter disc $26^{VI}$. It should be understood that any of the O-ring embodiments disclosed herein can be used as the O-ring for assembly $10^{VI}$.

Like assemblies 10, 10' and 10", an optional stopper $24^{VI}$ made from rubber or other suitable elastomeric material and having portions defining a stem receiving through-bore may be secured about outlet $22^{VI}$. This permits filter cup/filter stem assembly $10^{VI}$ to be secured and sealed to a fluid receiving vessel such as a flask.

Like frangible lock rings 32' and 32", frangible lock ring $32^{VI}$ has portions defining an annular bottom lip $33^{VI}$ that extends radially inwardly from an outer perimeter of the strip and is dimensioned to fit within recess $19^{VI}$. For embodiments without recess $19^{VI}$, lip $33^{VI}$ is dimensioned to register against the bottom perimeter edge of support surface $16^{VI}$. An inner wall of strip $32^{VI}$ has a cross-sectional diameter dimensioned to fit around, and register against, an outer surface of the annular shoulder formed on the perimeter of support surface $16^{VI}$.

Lock ring $32^{VI}$ also has portions defining an annular top lip $31^{VI}$ that extends radially inwardly from an outer perimeter of the strip and is dimensioned to register against a top surface of top housing $42^{VI}$. Top housing $42^{VI}$ may also be formed with a top annular recess, like recess $19a'''$ shown in FIG. 8, dimensioned to receive top lip $31^{VI}$ (as shown in FIG. 15). With this construction, locking ring $32^{VI}$ is superposed about, and registered against, the registration surfaces of top housing $42^{VI}$ and bottom housing/stem $44^{VI}$ so as to secure them together and prevent lateral and axial displacement of upper housing $42^{VI}$ from stem $40^{VI}$.

As shown in FIG. 16, hybrid cup/stem assembly $10^{VI}$ can be assembled according to the procedures disclosed for the embodiments shown in FIGS. 9-14. Lock ring $32^{VI}$ is secured to top housing segment $42^{VI}$ by flexing upper lip $31^{VI}$ over and around the perimeter of top housing segment $42^{VI}$ so that the perimeter is placed within the boundaries of lock ring $32^{VI}$. O-ring $30^{VI}$ can be secured in O-ring channel $41^{VI}$ before or after assembly of lock ring $32^{VI}$ to top housing $42^{VI}$. It may be easier to assemble the O-ring to the housing first when the bottom surface of the top housing is exposed and unencumbered by lock ring $32^{VI}$.

Next, filter $26^{VI}$ is placed on support surface $16^{VI}$ to form a bottom sub-assembly. The combination of bottom housing/stem $44^{VI}$ and filter disc $26^{VI}$ is assembled to a bottom end of lock ring $32^{VI}$ by flexing lower lip $33^{VI}$ over and around the perimeter of bottom housing $44^{VI}$ to complete the assembly. It should be understood that lock ring $32^{VI}$ can be secured to either the top housing or the bottom housing subassembly first and to the other housing or subassembly segment second.

Frangible strip $32^{VI}$ includes a removable pull strip $34^{VI}$ that extends around at least a substantial portion of the perimeter of strip $32^{VI}$. A pair of grooves $35^{VI}$ that may be substantially parallel are formed in strip $32^{VI}$ and define the lateral edges of pull strip $34^{VI}$. Grooves $35^{VI}$ reduce the thickness of strip $32^{VI}$ and provide a structural weak point in the construction of strip $32^{VI}$. These annular weakened sections reduce the amount of force needed to permit pull strip $34^{VI}$ to be detached from strip $32^{VI}$ by tearing the material that forms and defines the valley or grooves $35^{VI}$. Like grooves 35, the cross-sectional shape of grooves $35^{VI}$ may be in the form of a "v," "u," "square u," or any other shape that reduces the thickness of the material that defines the border between frangible strip $32^{VI}$ and pull strip $34^{VI}$. In an alternative embodiment, annular grooves $35^{VI}$ may be formed with two or more different thicknesses to mimic the structure of a zipper.

In a further alternative embodiment, annular grooves $35^{VI}$ may be formed with two or more regions having different thicknesses to mimic the structure of a zipper. The differently dimensioned sections or regions are formed in an alternating, or variable pattern (when more than two thicknesses are used) to create zones of varying structural weakness that facilitate and ease detachment of the pull strip via hand or machine pressure. In a yet further alternative embodiment, grooves $35^{VI}$ are formed with a plurality of perforations that further reduce the amount of material that make up the grooves and thus, the force needed to separate pull strip $34^{VI}$ from strip $32^{VI}$.

Figure 40:
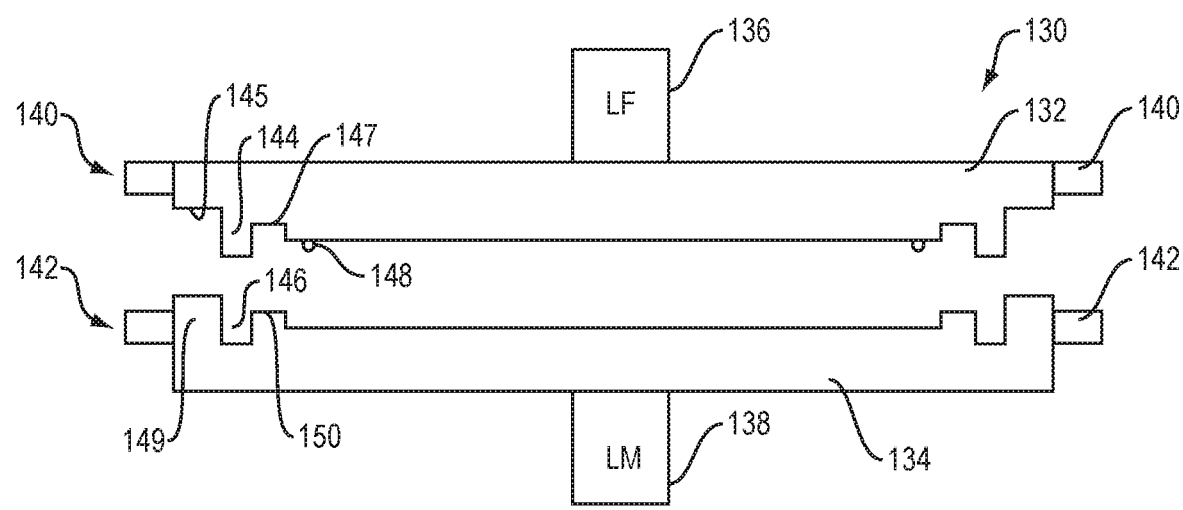
FIG. 40 is a side exploded view of a single use filter media holder with tongue and groove seals according to yet another embodiment of the disclosure.
Figure 41:
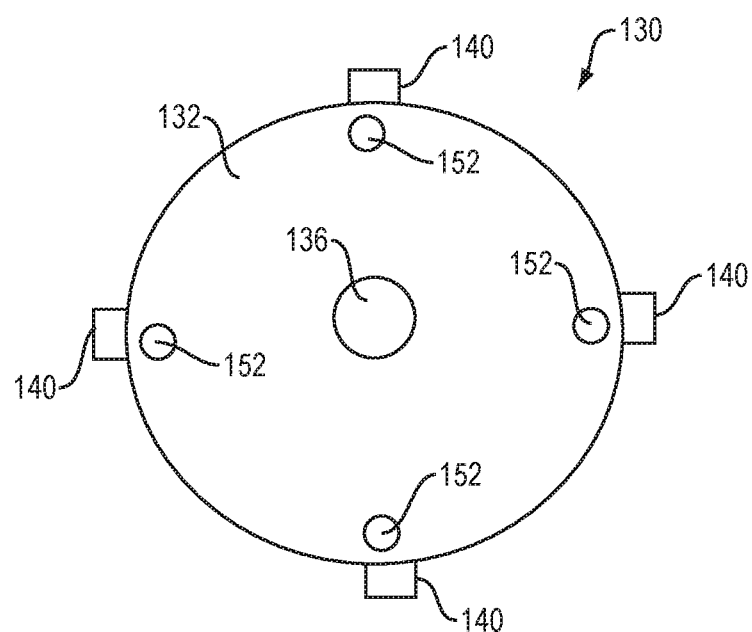
FIG. 41 is a top plan view of the top inlet section of the single use media holder shown in FIG. 40.

With any of the embodiments disclosed herein, in place of, or as an adjunct to, the O-ring, an annular ridge extending upwardly from a top surface of the bottom housing and radially inwardly from the perimeter of the housing may be used to secure and seal the filter disc in the housing as shown in FIGS. 40 and 41, and as disclosed in more detail below. The ridge functions to create an annular pinch point to compress the disc filter against the bottom surface of the top housing to create a substantially liquid-tight seal. This can be used to enhance the sealing effect of the O-ring, or to replace the O-ring and eliminate a relatively expensive part that adds to the complexity of the overall assembly and a potential source of contamination if the O-ring material is reactive with the components of the fluids and/or gases being filtered.

Figure 18:
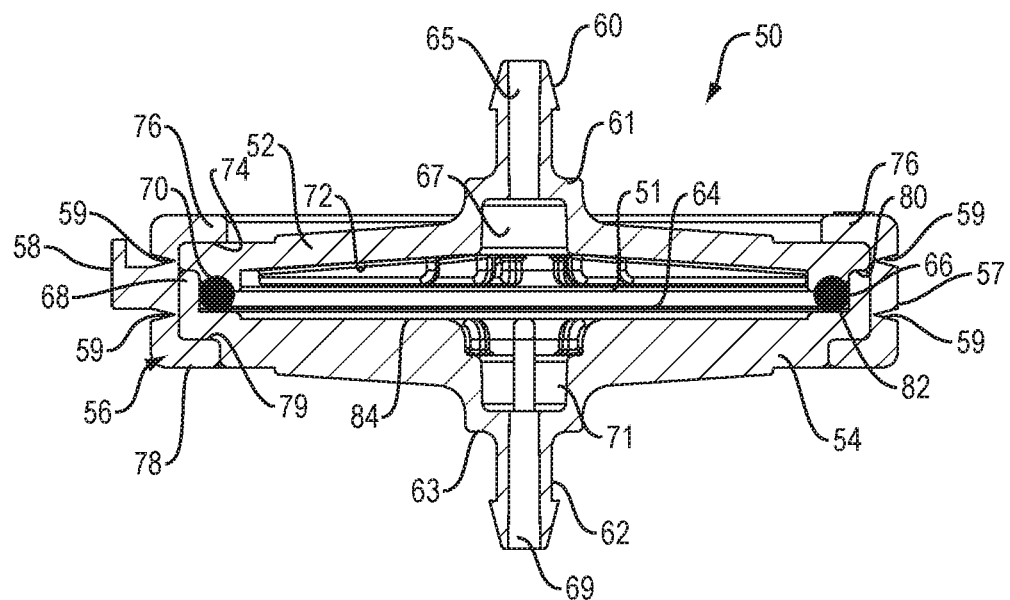
FIG. 18 is a side sectional view in elevation of a disposable filter capsule/filter disc assembly with a large-diameter O-ring according to another embodiment of the disclosure.
Figure 19:
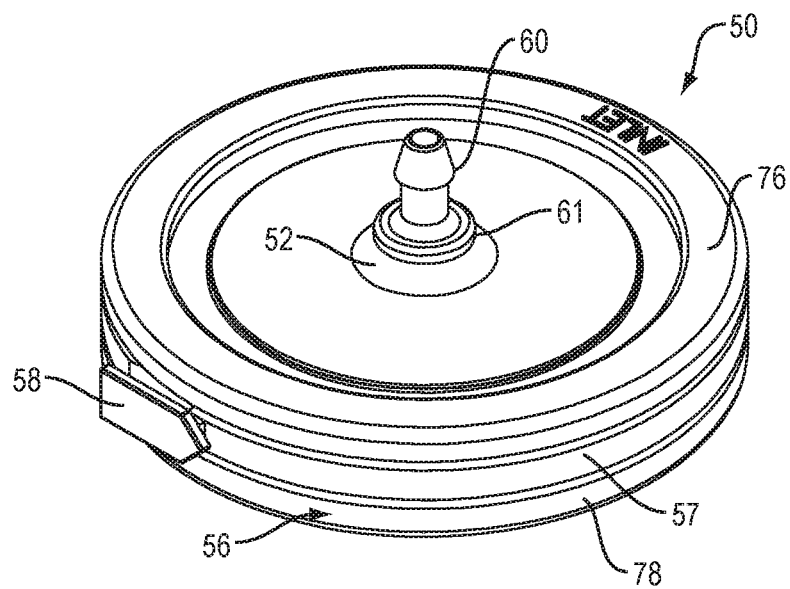
FIG. 19 is a top side perspective view of the filter capsule/filter disc assembly shown in FIG. 18.

Referring now to FIGS. 18 and 19, in another aspect of the disclosure, a break-away filter capsule designated generally as 50 includes a lock ring to permit easy access to an enclosed disc filter. A top housing shell 52 defines a first portion of a filter chamber, designated generally as 51, on a bottom side 72. Extending upwardly from top shell 52 is an inlet barb 60 that defines an inlet barb channel 65. A top shell fluid chamber 67 is formed in a barb shoulder 61 that functions as a stop for a tube secured to inlet barb 60. Chamber 67 is in fluid communication with barb channel 65 and filter chamber 51.

Top shell 52 may define a top annular recess 74 extending radially inwardly from a perimeter of shell 52 and dimensioned to receive a top lip of a lock ring, designated generally as 56, and disclosed in more detail below. Top shell 52 has further portions that define a bottom annular recess 80 formed on a bottom edge of the shell perimeter and dimensioned to receive a perimeter segment of a bottom shell 54 disclosed in more detail below. Top shell 52 has still further portions that define an annular O-ring channel 76 formed radially inwardly from bottom recess 80 and open towards the downward side of shell 52. An O-ring 66 is secured in channel 76 to create a fluid-tight seal when top shell 52 is secured to bottom shell 54.

Bottom shell 54 defines a second portion of filter chamber 51 on a top side 84 of the bottom shell. Extending upwardly from top side 84 is an annular filter support shelf 82 positioned to align with O-ring channel 76 when the shell halves are joined. This shelf provides a solid support surface against which to compress O-ring 66 against the perimeter of an enclosed filter disc 64 so as to create the fluid-tight seal. Extending upwardly from shelf 82 at a radially outward edge of the shelf and a perimeter of bottom shell 54 is an annular outer shoulder 68 dimensioned to receive filter disc 64. Shoulder 68 prevents lateral displacement of an enclosed filter disc and also functions as a support surface for part of O-ring 66.

Extending downwardly from a bottom surface of bottom shell 54 is an outlet barb 62 that defines an outlet barb channel 69. A bottom shell fluid chamber 71 is formed in a barb shoulder 63 that functions as a stop for a tube secured to outlet barb 62. Bottom shell chamber 71 is in fluid communication with outlet barb channel 69 and filter chamber 51. An annular bottom shell recess 79 is formed on a bottom side of the bottom shell perimeter wall to receive a lower lip of lock ring 56 as disclosed in more detail below. Recess 79 improves the "lock-and-key" fit of the lock ring to the bottom shell so as to maintain the axial and lateral orientation of the shell halves when joined.

Like other lock rings disclosed herein, lock ring 56 is a frangible lock ring with portions defining an annular bottom lip 78 that extends radially inwardly from an outer perimeter of the ring and is dimensioned to fit within bottom shell recess 79. For embodiments without recess 79, lip 78 is dimensioned to register against the bottom perimeter edge of bottom shell 54. An inner wall of lock ring 56 has a cross-sectional diameter dimensioned to fit around, and register against, an outer surface of shoulder 68. Alternatively, the cross-sectional diameter may be dimensioned to be slightly larger than the cross-sectional diameter of shoulder 68 to as not to register against the shoulder completely, i.e., to permit some relative movement of the adjoining components, but not so much that the fluid-tight seal of the assembly is compromised.

Lock ring 56 also has portions defining an annular top lip 76 that extends radially inwardly from an outer perimeter of the strip and is dimensioned to register against a top surface of top housing 52. As disclosed previously, top housing 52 may also be formed with a top annular recess 74 dimensioned to receive top lip 76. With this construction, locking ring 56 is superposed about, and registered against, the registration surfaces of top housing 52 and bottom housing/stem 54 so as to secure the components together and prevent lateral and axial displacement of top shell 52 from bottom shell 54.

Lock ring 56 includes a removable pull strip 57 that extends around at least a substantial portion of the perimeter of ring 56. A pull tab 58 is formed integrally, or modularly, with an end of pull strip 57 to facilitate manual removal of the pull strip. A pair of grooves 59 that may be substantially parallel are formed in ring 56 and define the lateral edges of pull strip 57. Grooves 59 reduce the thickness of strip 57 and provide a structural weak point in the construction of strip 57. These annular weakened sections reduce the amount of force needed to permit pull strip 57 to be detached from lock ring 56 by tearing the material that forms and defines the valley or grooves 59. Like grooves 35, the cross-sectional shape of grooves 59 may be in the form of a "v," "u," "square u," or any other shape that reduces the thickness of strip 57.

In an alternative embodiment, annular grooves 59 may be formed with two or more different thicknesses to mimic the structure of a zipper. The differently dimensioned sections are formed in an alternating, or variable pattern (when more than two thicknesses are used) to create weakened zones that permit detachment via hand or machine pressure. In a further alternative embodiment, grooves 59 are formed with a plurality of perforations that further reduce the amount of material that make up the grooves and thus, the force needed to separate pull strip 57 from lock ring 56.

Figure 20:
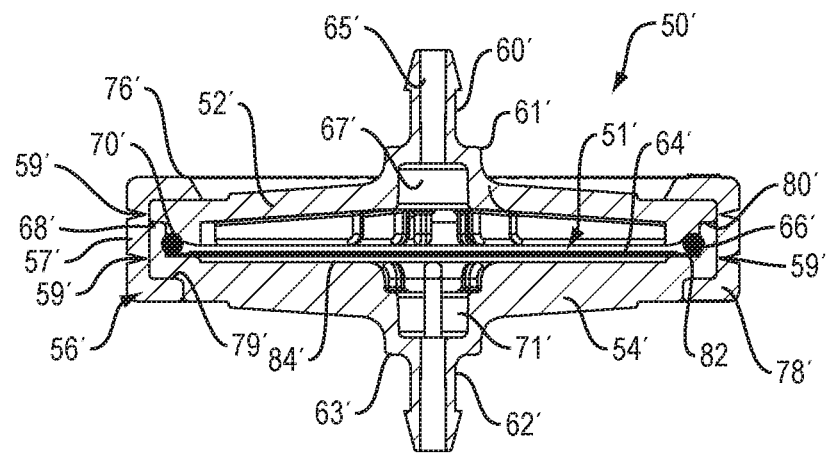
FIG. 20 is a side sectional view in elevation of a disposable filter capsule/filter disc assembly with a small-diameter O-ring according to yet another embodiment of the disclosure.
Figure 21:
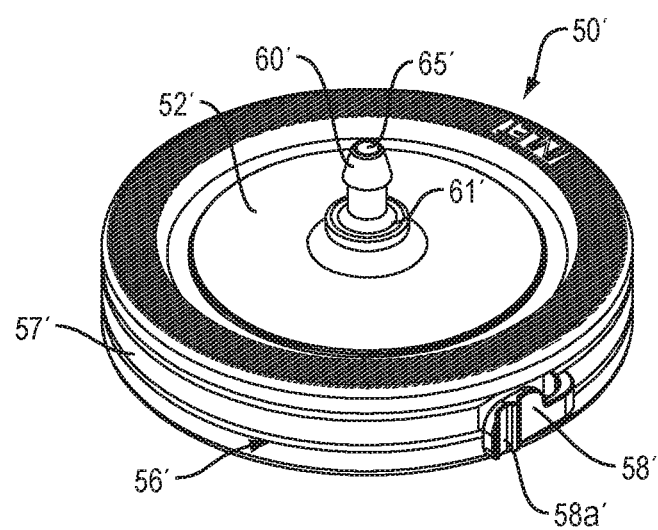
FIG. 21 is a top side perspective view of the filter capsule/filter disc assembly shown in FIG. 20.
Figure 22:
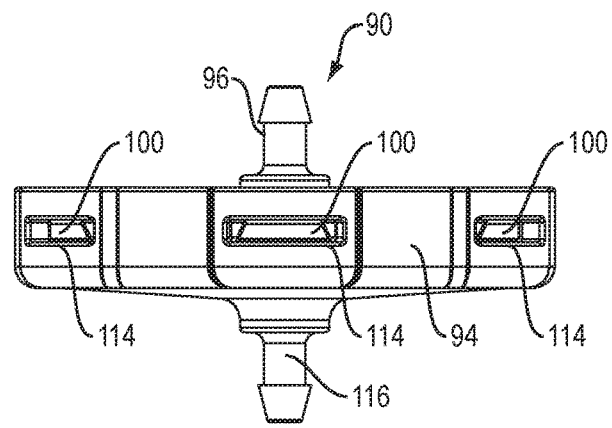
FIG. 22 is a side view in elevation of a disposable filter capsule/filter disc assembly with snap-fit capsule housing sections according to still another embodiment of the disclosure.
Figure 23:
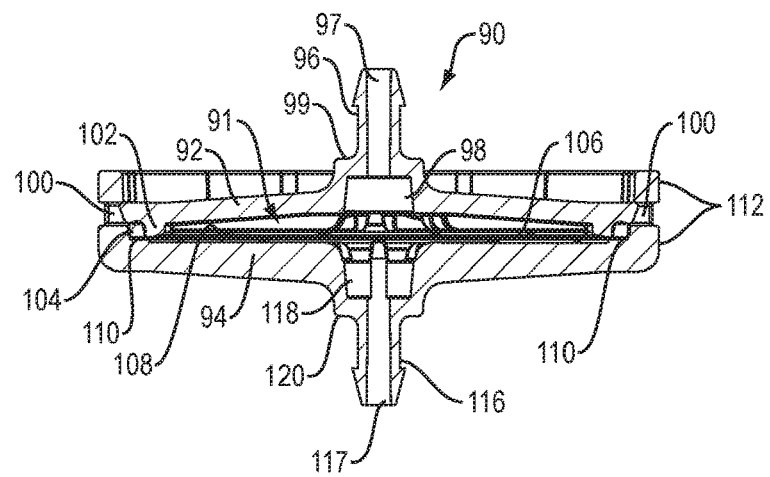
FIG. 23 is a side sectional view in elevation of the filter capsule/filter disc assembly embodiment shown in FIG. 22.
Figure 24:
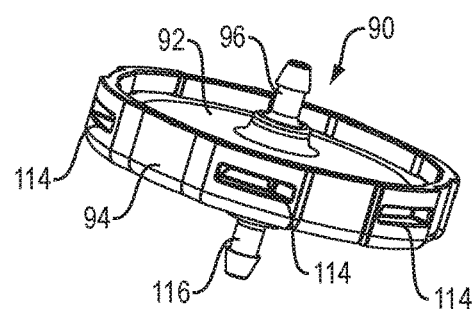
FIG. 24 is a top side perspective view of the filter capsule/filter disc assembly embodiment shown in FIG. 22.
Figure 25:
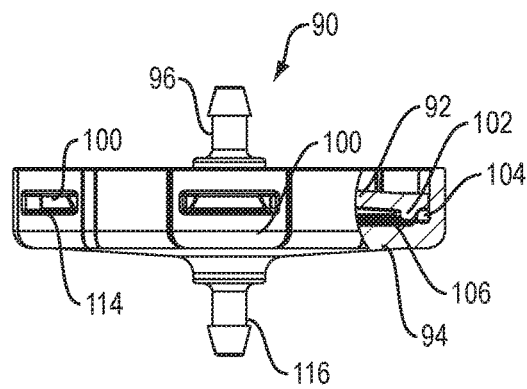
FIG. 25 is a partial cutaway side view in elevation of the filter capsule/filter disc assembly embodiment shown in FIG. 22.
Figure 26:
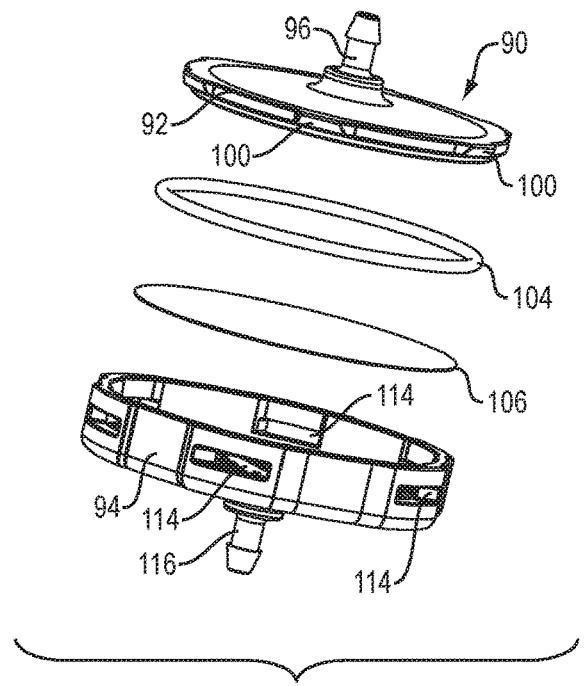
FIG. 26 is an exploded perspective view of the filter capsule/filter disc assembly shown in FIGS. 22 and 25.
Figure 27:
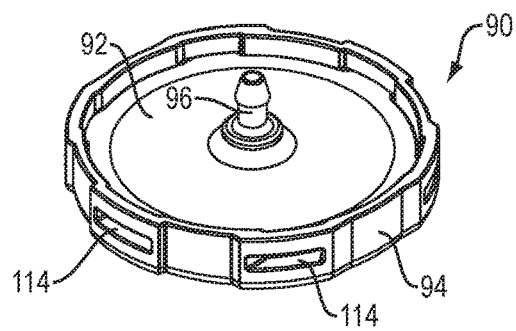
FIG. 27 is a top side perspective view of the filter capsule/filter disc assembly shown in FIG. 22.

Referring now to FIGS. 20 and 21, in another aspect of the disclosure, a break-away filter capsule designated generally as 50' has the identical features of capsule 50 with the exception of the O-ring channel and the pull tab construction. The description of the components for filter capsule 50' are identical to the descriptions for the components of filter capsule 50 and thus all the primed reference characters used in FIGS. 20 and 21 are identical to the unprimed reference characters and the corresponding components designated by those reference characters in FIGS. 18 and 19.

With respect to the particular differences between capsule 50 and capsule 50', rather than having O-ring channel 70 of capsule 50, capsule 50' has an O-ring recess 70' formed adjacent to, and radially inwardly and downwardly from, a bottom recess 80'. The O-ring recess does not have a defined outer annular wall like O-ring channel 70, but is open on a radially outer edge. In this embodiment, an O-ring 66' is secured and compressed between an inner wall of recess 80' and an inner surface of an outer shoulder 68' of a bottom shell 54'. The inner wall of recess 80' may be chamfered to accommodate the contour of O-ring 66'. Like shoulder 68, shoulder 68' prevents lateral displacement of an enclosed filter disc 64', but does so in cooperation with the inner wall of recess 80'.

The second difference between capsule 50' and capsule 50 is the pull tab design. For capsule 50', a pull tab 58' is formed with a corrugated or ribbed finger depression 58a' designed to be grasped with fingers and provide a more positive gripping surface to further facilitate removal of a pull strip 57'.

Referring now to FIGS. 22-27, in another aspect of the disclosure, a snap-fit filter capsule, designated generally as 90, has shell halves each formed with a series of tabs and/or corresponding slots to releasably secure the shell halves together. A top housing shell 92 defines a first portion of a filter chamber, designated generally as 91, on a bottom side 92. Extending upwardly from top shell 92 is an inlet barb 96 that defines an inlet barb channel 97. A top shell fluid chamber 98 is formed in a barb shoulder 99 that functions as a stop for a tube secured to inlet barb 96. Chamber 98 is in fluid communication with barb channel 97 and filter chamber 91.

Top shell 92 has portions defining one or more locking tabs 100 extending radially outwardly from a perimeter of shell 92. Each tab may have smooth surfaces or may be formed with one or more ribs (not shown), positioned laterally along the tab and on a top surface and/or a bottom surface of the tab to engage a corresponding slot wall of bottom shell 94, disclosed in more detail below. An annular filter disc securing ridge 102 extends downwardly from a bottom surface of top shell 92 and is positioned radially inwardly from the perimeter of the shell. An outer wall of ridge 102, in combination with the bottom surface of shell 92, forms a part of a sealing surface against which an O-ring 104 registers against to create a liquid-tight seal. The apex or downwardly facing surface of ridge 102 registers against an enclosed filter disc 106 and compresses a perimeter of the disc against a corresponding surface of bottom shell 94 to secure the disc in the shell.

Bottom shell 94 defines a second portion of filter chamber 91 on a top side 108. Extending upwardly from top side 108 is an annular filter support shelf 110 positioned to align with ridge 102 when the shell halves are joined. This shelf provides a solid support surface against which to compress the perimeter of filter disc 106 so as to contribute to the creation of the fluid-tight seal. A radially outward section of support shelf 110 provides a registration surface for O-ring

104. Extending upwardly from shelf 108, at a radially outward edge of the shelf and a perimeter of bottom shell 94, is an annular outer shoulder 112 dimensioned to receive top shell 92. Shoulder 112 prevents lateral displacement of top shell 92 as well as the enclosed filter disc, and also functions as a registration surface for part of O-ring 104. An inner wall of shoulder 112 is spaced from ridge 102 to form a gap when the shelf halves are joined. The gap functions as an O-ring channel to receive O-ring 104.

Shoulder 112 has portions defining one or more slots 114 dimensioned to receive tabs 100. One slot is formed for each tab. Engagement of tabs 100 with slots 114 provides a mechanical lock between the housing shell halves and compresses the enclosed O-ring 104 between the housing halves to ensure a fluid-tight seal. The locations of the slots within the wall of bottom shell 94 are set so that engagement with the tabs compresses the halves against the enclosed filter disc media or membrane and creates a fluid-tight seal. The tightness of the seal can be increased by lowering the slot locations in the wall, or decreased by raising the slot locations in the wall.

Extending downwardly from a bottom surface of bottom shell 94 is an outlet barb 116 that defines an outlet barb channel 117. A bottom shell fluid chamber 118 is formed in a barb shoulder 120 that functions as a stop for a tube secured to outlet barb 116. Bottom shell chamber 118 is in fluid communication with outlet barb channel 117 and filter chamber 91.

Once filter capsule 90 has been used to filter the desired fluids, access to the enclosed filter disc media or membrane can be accomplished in one of two ways. In a first method, tabs 100 are snapped off with a hand implement, such as a pair of pliers. This enables top shell 92 to be separated from bottom shell 94 as the tabs are no longer engaging the slots. The low profile of bottom shell 94 provides easy access to the enclosed filter disc media or membrane 106. If one or more optional tabs are included with the filter disc, the tabs may be used to facilitate removal of the filter disc/membrane as disclosed for other similar embodiments disclosed herein. The low profile wall of bottom shell 94 enables the user to remove the enclosed filter disc/membrane without tilting it so as to maximize the capture of any materials captured by the filter/membrane.

The second method that can be used to remove top shell 92 from bottom shell 94 is to flex the wall of shell 94 outwardly at the location of a slot/tab assembly so as to disengage the tab from the slot. The disengagement is accomplished by moving the tab out of the plane occupied by the slot, i.e., by lifting the top shell slightly out of the bottom shell at the location of the disengaged tab. This procedure is followed for each slot/tab assembly until all the tabs are disengaged from the slots. The top shell can then be extricated from the bottom shell so as to expose the enclosed filter disc/membrane. The filter disc/membrane can then be removed using the same method described for the prior disclosed method.

Figure 28:
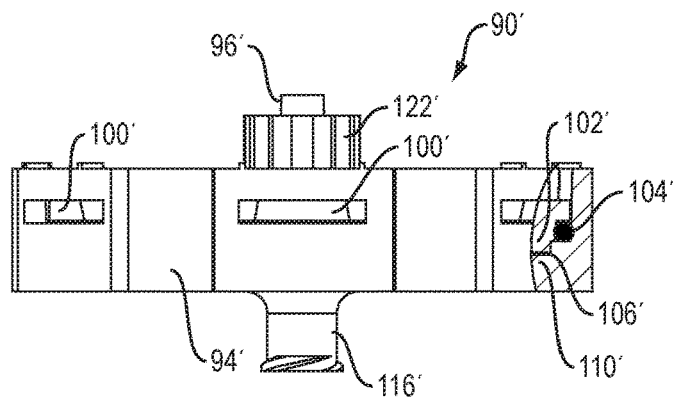
FIG. 28 is a partial cutaway side view in elevation of a disposable filter capsule/filter disc assembly with snap-fit capsule housing sections, an O-ring seal and luer lock ports according to a further embodiment of the disclosure.
Figure 29:
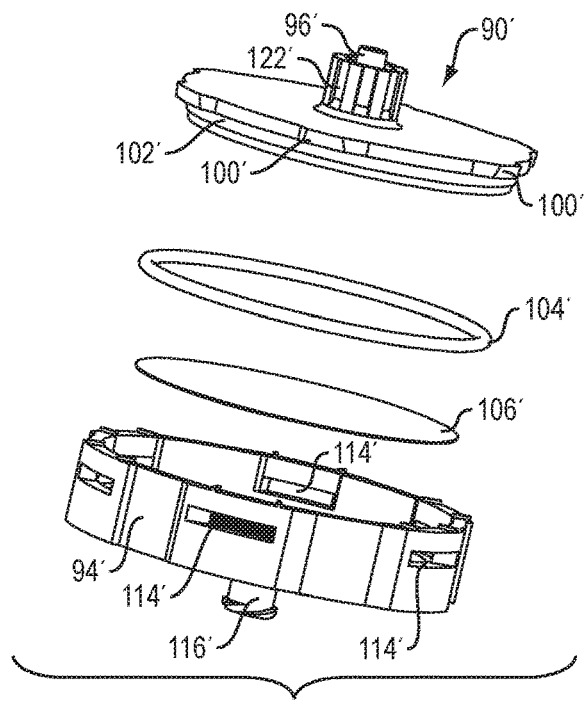
FIG. 29 is an exploded perspective view of the filter capsule/filter disc assembly embodiment shown in FIG. 28.
Figure 30:
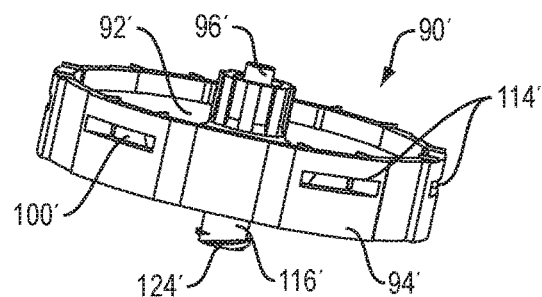
FIG. 30 is a top side perspective view of the filter capsule/filter disc assembly shown in FIG. 28.

Referring now to FIGS. 28-30, in another aspect of the disclosure, a snap-fit breakaway filter capsule shown designated generally as 90' includes several of the features shown for snap-fit filter capsule 90 with the substitution of luer lock components in place of the barbed inlet and outlet ports. As shown in the figures, snap-fit filter capsule 90' has a shell comprised of shell halves each formed with a series of tabs and/or corresponding slots to releasably secure the shell halves together. It should be understood for any of the snap-fit capsule embodiments disclosed herein, either shell half, top or bottom, may be formed with either tabs or tab-receiving slots. Each half may have one of the features with the other half having the other complimentary feature. Each half may also be formed with a combination of the two features with the other half having the corresponding combination of the two features to secure the shell halves together.

A top housing shell 92' defines a first portion of a filter chamber, designated generally as 91', on a bottom side 92'. Extending upwardly from top shell 92' is an inlet port 96' that defines a port channel (not shown). Also extending upwardly from top shell 92' is a luer lock female fitting 122' formed with threading (not shown) on an internal wall. Fitting 122' is formed about inlet port 96' and permits the attachment of a tube or other fluid and/or gas delivery component with a corresponding luer lock male fitting (not shown). Engagement of the luer lock fittings connects inlet port 92' with a fluid/gas source. The port channel is in fluid communication with filter chamber 91'.

Top shell 92' has portions defining one or more locking tabs 100' extending radially outwardly from a perimeter of shell 92'. Each tab may have smooth surfaces or may be formed with one or more ribs (not shown), positioned laterally along the tab and on a top surface and/or a bottom surface of the tab to engage a corresponding wall(s) of a slot formed in bottom shell 94', disclosed in more detail below. An annular filter disc securing ridge 102' extends downwardly from a bottom surface of top shell 92' and is positioned radially inwardly from the perimeter of the shell. An outer wall of ridge 102', in combination with the bottom surface of shell 92', forms a part of a sealing surface against which an O-ring 104' registers against to create a liquid-tight seal. The apex or downwardly facing surface of ridge 102' registers against an enclosed filter disc media or membrane 106' and compresses a perimeter of the disc/membrane against a corresponding surface of bottom shell 94' to secure the disc and/or membrane in the shell.

Bottom shell 94' defines a second portion of filter chamber 91' on a top side of the shell half. Extending upwardly from the top side is an annular filter support shelf 110' positioned to align with ridge 102' when the shell halves are joined. This shelf provides a solid support surface against which to compress the perimeter of filter disc 106' so as to contribute to the creation of the fluid-tight seal. A radially outward section of support shelf 110' provides a registration surface for O-ring 104'. Extending upwardly from shelf 110' at a radially outward edge of the shelf and a perimeter of bottom shell 94' is an annular outer shoulder 112' dimensioned to receive top shell 92'. Shoulder 112' prevents lateral displacement of top shell 92' as well as enclosed filter disc 106', and also functions as a registration surface for part of O-ring 104'. An inner wall of shoulder 112' is spaced from ridge 102' to form a gap when the shelf halves are joined. The gap functions as an O-ring channel to receive O-ring 104'.

Shoulder 112' has portions defining one or more slots 114' dimensioned to receive tabs 100'. One slot is formed for each tab. Engagement of tabs 100' with slots 114' provides a mechanical lock between the housing shell halves and compresses the enclosed O-ring 104' between the housing halves to ensure a fluid-tight seal.

Extending downwardly from a bottom surface of bottom shell 94' is a combination luer lock male fitting/outlet port 116' that defines an outlet channel (not shown). The outlet port chamber is in fluid communication with filter chamber 91'. An outer wall of port 116' is formed with threading 124' that corresponds in spacing and thickness with the treading of female fitting 122. This permits port 116' to be secured to a fluid/gas transport component with a corresponding luer lock female fitting, if needed.

To assemble the snap-fit capsule 90', filter disc 106' is placed in bottom housing 94' and registered against shelf 110'. O-ring 104' is placed inside bottom shell 94' over the perimeter of disc 106'. Next, top shell 92' is placed over bottom shell 94' so that each tab 100' is aligned with a slot 114' in shoulder 112'. Top shell 92' is then compressed into bottom shell 94', which causes tabs 100' to flex upwardly and permit the downward movement of top shell 92' into the inner space of shoulder 112'. Once the tabs have reached slots 114' that tabs flex out into the slots to lock top shell 92' to bottom shell 94'. At this point, ridge 102' will be registered against O-ring 104' and filter disc and/or membrane 106' to create a fluid-tight seal. To remove top shell 92' from bottom shell 94', the tabs can either be snapped off, or re-flexed by pulling on inlet port 96' until the top shell half is released from the bottom shell half in the same manner as disclosed in more detail for capsule 90.

Figure 31:
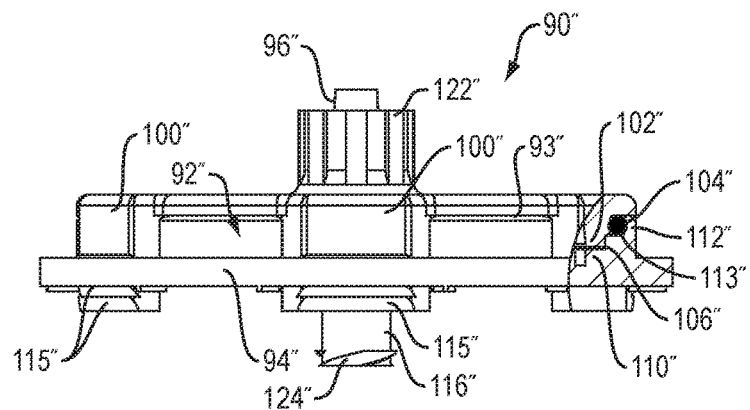
FIG. 31 is a side view in elevation of a disposable filter capsule/filter disc assembly with adjustable snap-fit capsule housing sections, an O-ring seal and luer lock ports according to a yet further embodiment of the disclosure.
Figure 32:
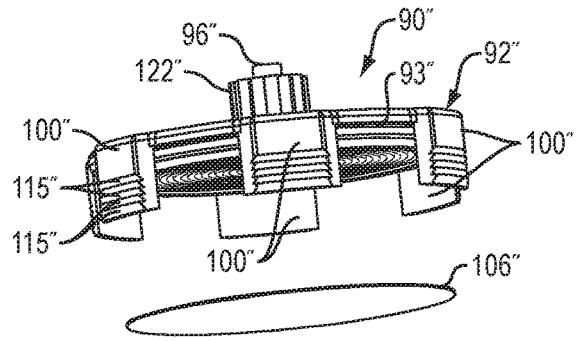
FIG. 32 is an exploded perspective view of the filter capsule/filter disc assembly embodiment shown in FIG. 31.
Figure 32:
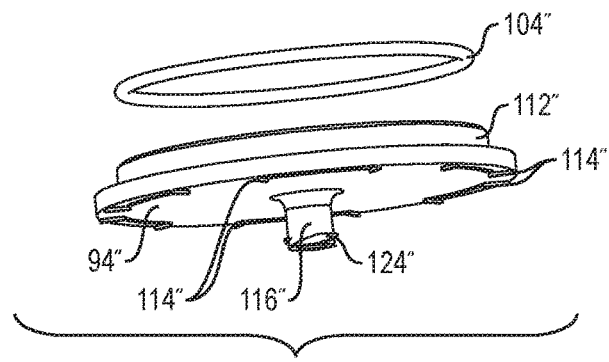
Figure 33:
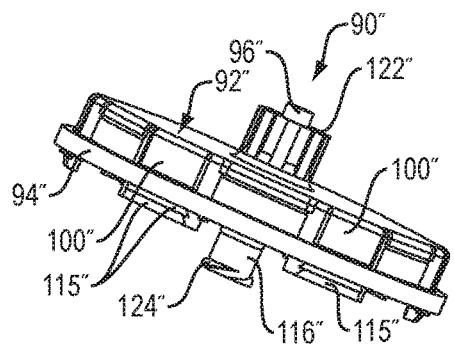
FIG. 33 is a side top perspective view of the filter capsule/filter disc assembly embodiment shown in FIG. 31.

Referring now to FIGS. 31-33, in a further aspect of the disclosure, another height-adjustable, snap-fit breakaway capsule is shown with vertically extending slot and tab connectors. A breakaway filter capsule designated generally as 90" includes several of the features shown for snap-fit filter capsule 90' including the luer lock ports. Unlike capsule 90', snap-fit filter capsule 90" has a shell comprised of shell halves each formed with a series of vertical tabs and/or corresponding vertical slots to releasably and adjustably secure the shell halves together. It should be understood for any of the snap-fit capsule embodiments disclosed herein, either shell half, top or bottom, may be formed with either tabs or tab-receiving slots. Each half may have one of the features with the other half having the other complimentary feature. Each half may also be formed with a combination of the two features with the other half having the corresponding combination of the two features to secure the shell halves together.

A top housing shell half 92" defines a first portion of a filter chamber, designated generally as 91", on a bottom side 92". Extending upwardly from top shell 92" is an inlet port 96" that defines a port channel (not shown). Also extending upwardly from top shell 92" is a luer lock female fitting 122" formed with threading (not shown) on an internal wall. Fitting 122" is formed about inlet port 96" and permits the attachment of a tube or other fluid and/or gas delivery component with a corresponding luer lock male fitting (not shown). Engagement of the luer lock fittings connects inlet port 92" with a fluid/gas source. The port channel is in fluid communication with filter chamber 91".

Top shell 92" has portions defining one or more vertically oriented locking tabs 100" extending downwardly and positioned radially outwardly from a perimeter shoulder 93" of shell 92". Each tab may have smooth surfaces or may be formed with one or more ribs or ridges 115", positioned laterally along the tab and on a top surface and/or a bottom surface of the tab to engage a corresponding wall(s) of a slot formed in bottom shell 94" disclosed in more detail below.

An annular filter disc securing shoulder 102" extends downwardly from a bottom surface of top shell 92" and is positioned radially inwardly from the perimeter shoulder 93". An outer wall of shoulder 102', in combination with a perimeter shoulder of bottom shell half 94", forms a gap within and against which an O-ring 104' registers to create a liquid-tight seal. The bottom facing surface of shoulder 102" registers against an enclosed filter disc media or membrane 106" and compresses a perimeter of the disc against a corresponding surface of bottom shell 94" to secure the disc in the shell.

Bottom shell 94" defines a second portion of filter chamber 91" on a top side of the shell half. Extending upwardly from the top side is an annular filter support shelf 110" positioned to align with ridge 102" when the shell halves are joined. This shelf provides a solid support surface against which to compress the perimeter of filter disc 106" so as to contribute to the creation of the fluid-tight seal. Extending upwardly from shelf 110" at a radially outward edge of the shelf and a perimeter of bottom shell 94" is an annular outer shoulder 112" dimensioned to fit within and register against top shell half perimeter shoulder 93". Shoulder 112" prevents lateral displacement of top shell 92" as well as enclosed filter disc 106", and also functions as a registration surface for part of O-ring 104" as previously disclosed. More specifically, a portion of an inner wall of shoulder 112' forms an O-ring receiving shelf 113" spaced from shoulder 102" to form a gap when the shelf halves are joined. The gap functions as the O-ring channel to receive O-ring 104".

A perimeter of bottom shell half 94" radially outward of shoulder 112" has portions defining one or more slots 114" dimensioned to receive tabs 100". One slot is formed for each tab. Engagement of tabs 100" with slots 114" provides a mechanical lock between the housing shell halves and causes the compression of the enclosed O-ring 104" between the housing halves to ensure a fluid-tight seal.

Slots 114" function like a pawl of a ratchet when engaged with ridges 115" of tabs 100", which function like the teeth on cable ties or on a linear rack of a ratchet. Each ridge 115" is formed with a tapered surface and a secondary surface substantially orthogonal to the longitudinal axis of the tab. The slots are dimensioned and positioned to allow the passage of ridges 115" with the application of a force to urge top shell half 92" onto bottom shell half 94". As the tabs are urged into the slots, the distal ends of tabs 100" flex inwardly as each ridge 115" passes through one of the slots 114".

Inward flexion of tab 100" is accomplished by the registration of an edge of slot 114" against a tapered surface of ridge 115". As tab 100" is compressed into, and travels past slot 114", the tapered surfaces of ridge 115" (facing radially outwardly), urge the distal ends of tabs 100" inwardly until the apexes of ridge 115" pass downwardly beyond slots 114". Once passage is achieved, tab 100" flex back to substantially their original position. In this position, the orthogonal surface of ridge 115" that has passed through the slot registers against the bottom surface of bottom shell half 94" and functions to mechanically lock top shell half 92" onto bottom shelf half 94". The sequence of inward flexion and outward return of tabs 100" occurs for each ridge 115" that traverses a slot 114". The flexion cycle is reversed to outward flexion and inward return should ridges 115" be formed on inner walls of tabs 100".

To adjust the compressive force applied to enclosed filter disc 106", the tabs of top shell half 92" are urged into slots 114" and past a plurality of ridges until the desired compressive force is reached. As should be understood by those having ordinary skill in the art, only one ridge has to be passed in order to secure top shell half 92" to bottom shell half 94". The number of ridges needed to be engaged with the slots so as to secure the top shell to the bottom shell to form a fluid-tight seal will depend, in part, on the thickness of the filter disc media or membrane secured in the capsule. Thicker filter material will require fewer ridges engaged to effectuate an acceptable seal.

Extending downwardly from a bottom surface of bottom shell 94" is a combination luer lock male fitting/outlet port 116" that defines an outlet channel (not shown). The outlet port chamber is in fluid communication with filter chamber 91". An outer wall of port 116" is formed with threading 124" corresponding in spacing and thickness with the treading of female fitting 120". This permits port 116" to be secured to a fluid/gas transport component with a corresponding luer lock female fitting, if needed.

To assemble the snap-fit capsule 90", O-ring 104" is placed inside and on O-ring receiving shelf 113". Filter disc 106" is placed in bottom shell half 94" and registered against shelf 110". Next, top shell half 92" is placed over bottom shell 94" so that each tab 100" is aligned with, and urged into, a slot 114". Top shell 92" is then compressed into bottom shell 94" as previously disclosed. At this point, shoulder 102" will be registered against filter disc 106" and O-ring 104" will be secured between the corresponding sections of the shell halves to create a fluid-tight seal. To remove top shell 92" from bottom shell 94", the tabs can either be snapped off, or forcibly removed by pulling on inlet port 96" until the tabs disengage the slots and the top shell half is released from the bottom shell half. The flexion method described for capsule 90 to release the shell halves may also be used.

Figure 34:
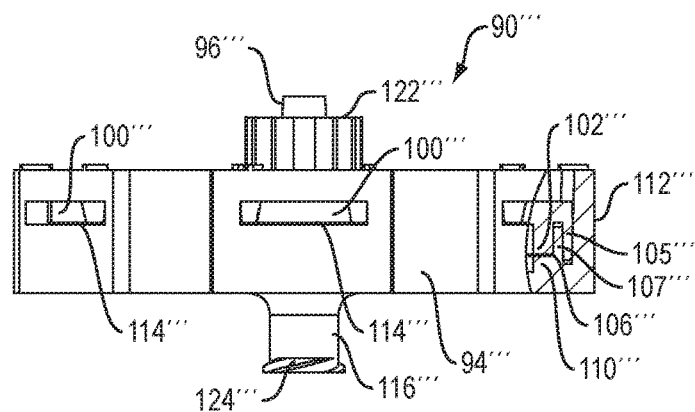
FIG. 34 is a side view in elevation of a disposable filter capsule/filter disc assembly with snap-fit housing sections, luer lock seals and luer lock ports according to a still further embodiment of the disclosure.
Figure 35:
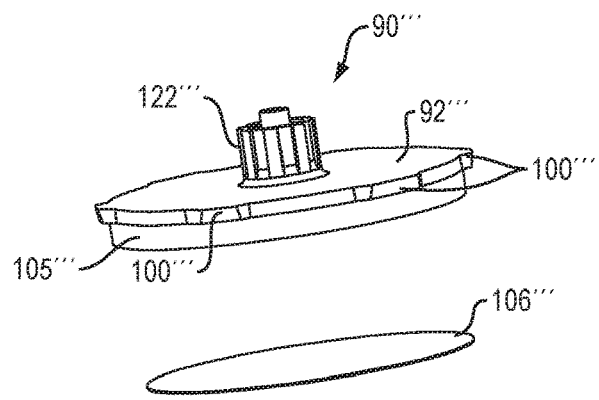
FIG. 35 is an exploded perspective view of the filter capsule/filter disc assembly embodiment shown in FIG. 34.
Figure 36:
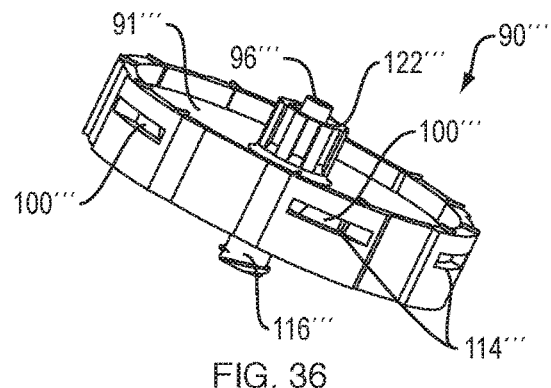
FIG. 36 is a top side perspective view of the filter capsule/filter disc assembly embodiment shown in FIG. 34.

Referring now to FIGS. 34-36, in another aspect of the disclosure, a snap-fit capsule is shown that eliminates the need for an O-ring seal. A snap-fit filter capsule designated generally as 90''' has many of the same features as snap-fit capsule 90' with different internal registration surfaces to create an O-ring-free, liquid-tight seal. A top shell half 92''' defines a first portion of a filter chamber (not shown), on a bottom side of the shell half. An inlet port 96''' extends upwardly from top shell 92''' and defines a port channel (not shown). Also extending upwardly from top shell 92''' is a luer lock female fitting 122''' formed with threading (not shown) on an internal wall. Fitting 122''' is formed about inlet port 96''' and permits the attachment of a tube or other fluid and/or gas delivery component with a corresponding luer lock male fitting (not shown). Engagement of the corresponding luer lock fitting segments connects inlet port 92''' with a fluid/gas source. The port channel is in fluid communication with the filter chamber.

Top shell half 92''' has portions defining one or more locking tabs 100''' extending radially outwardly from a perimeter of shell 92'''. Each tab may have smooth surfaces or may be formed with one or more ribs (not shown), positioned laterally along the tab and on a top surface and/or a bottom surface of the tab to engage a corresponding wall(s) of a slot formed in bottom shell 94''', disclosed in more detail below.

An annular filter disc securing shoulder 102''' extends downwardly from a bottom surface of top shell 92''' and is positioned radially inwardly from the perimeter of the shell half. An outer wall of shoulder 102''', in combination with sections of a bottom shell half 94''', forms a part of a sealing surface as disclosed in more detail below. The downwardly or bottom facing surface of shoulder 102''' registers against an enclosed filter disc 106''' and compresses a perimeter of the disc against a corresponding surface of bottom shell 94''' to secure the disc in the shell. An annular channel is defined by a top shell annular shoulder 105''' and shoulder 102''' toward a radially outward edge of shoulder 102''' to receive a corresponding shoulder of bottom shell half 94''', disclosed in more detail below.

Bottom shell half 94''' defines a second portion of filter chamber 91''' on a top side of the shell half. Extending upwardly from the top side of a bottom surface of shell half 94''' is an annular filter support shelf 110''' positioned to align with annular shoulder 102''' when the shell halves are joined. Shelf 110''' provides a solid support surface against which to compress the perimeter of filter disc 106''' so as to contribute to the creation of the fluid-tight seal. Extending upwardly from shelf 110''' is an annular bottom shell ridge 107''' dimensioned to fit within and register against the top and side walls of the channel formed by top shell annular shoulder 105''' and annular shoulder 102". The corresponding segments are dimensioned to create an interlocking friction fit that functions as a substitute for an O-ring to create a substantially liquid-tight seal.

Extending upwardly from shelf 110''', at a radially outward edge of the shelf and a perimeter of bottom shell half 94''', is an annular outer shoulder 112''' dimensioned to receive top shell 92''' and register against a radially outer surface of top shell annular shoulder 105'''. Shoulder 112''' contributes to the interlocking features of the shell halves and prevents lateral displacement of top shell 92''' as well as enclosed filter disc 106'''. Shoulder 112''' has portions defining one or more slots 114''' dimensioned to receive tabs 100'''. One slot is formed for each tab. Engagement of tabs 100''' with slots 114''' provides a mechanical lock between the housing shell halves and compresses the corresponding registration surfaces of the housing halves to ensure a fluid-tight seal.

Extending downwardly from a bottom surface of bottom shell 94''' is a combination luer lock male fitting/outlet port 116''' that defines an outlet channel (not shown). The outlet port chamber is in fluid communication with filter chamber 91'''. An outer wall of port 116''' is formed with threading 124''' that corresponds, in spacing and thickness, to the treading of female fitting 120'''. This permits port 116''' to be secured to a fluid/gas transport component with a corresponding luer lock female fitting, if needed.

To assemble snap-fit capsule 90''', filter disc 106''' is placed in bottom housing 94''' and registered against shelf 110'''. Next, top shell 92''' is placed over bottom shell 94''' so that each tab 100''' is aligned with a slot 114''' in shoulder 112'''. Top shell 92''' is then compressed into bottom shell 94''', which causes tabs 100''' to flex upwardly and permit the downward movement of top shell 92''' into the inner space of shoulder 112'''. This also permits the registration of shoulder 107''' into channel 105'''. Once the tabs have reached slots 114''' that tabs flex out into the slots to lock top shell 92''' to bottom shell 94'''. At this point, shoulder 102''' will be registered against filter disc 106''' and the corresponding registration surfaces of the shell halves will be joined to create a fluid-tight seal. To remove top shell 92''' from bottom shell 94''', the tabs can either be snapped off, or re-flexed by pulling on inlet port 96''' until the top shell half is released from the bottom shell half.

Figure 37:
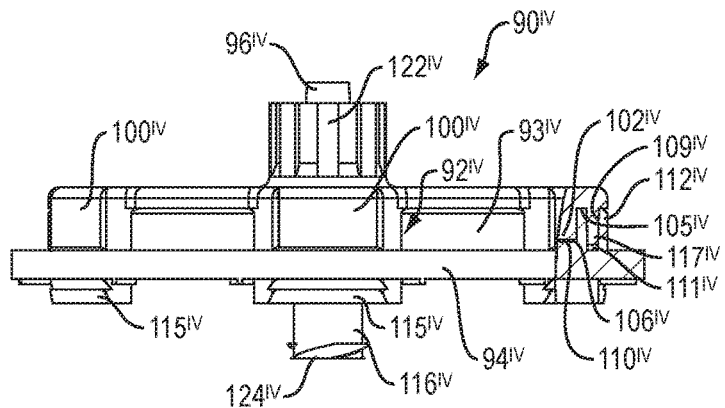
FIG. 37 is a side view in elevation of a disposable filter capsule/filter disc assembly with adjustable snap-fit housing sections, luer lock seals and luer lock ports according to another embodiment of the disclosure.
Figure 38:
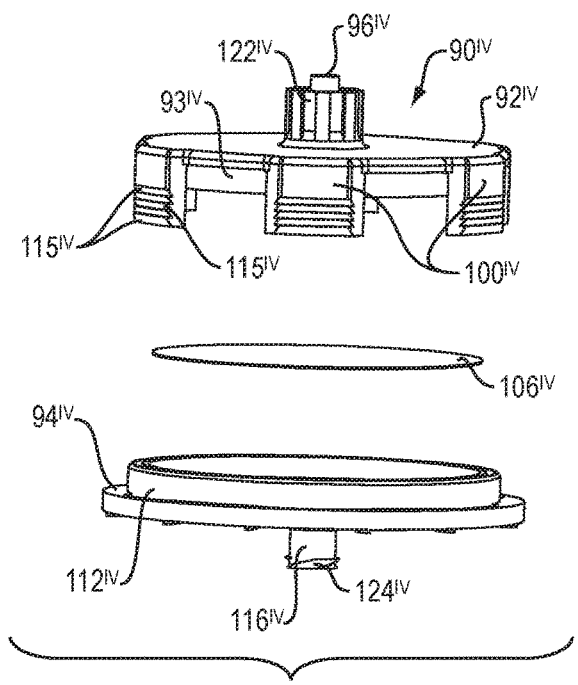
FIG. 38 is an exploded perspective view of the filter capsule/filter disc assembly embodiment shown in FIG. 37.
Figure 39:
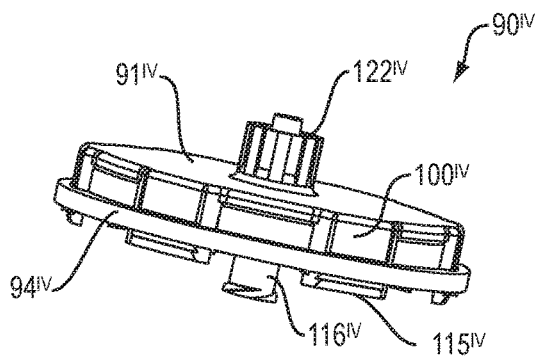
FIG. 39 is a top side perspective view of the filter capsule/filter disc assembly shown in FIG. 37.

Referring now to FIGS. 37-39, in a still further aspect of the disclosure, another height-adjustable snap-fit breakaway capsule is shown that eliminates the need for an O-ring seal. A snap-fit filter capsule designated generally as $90^{IV}$ has many of the same features as snap-fit capsule $90^{III}$ with different internal registration surfaces to create an O-ring-free, liquid-tight seal. A top housing shell half $92^{IV}$ defines a first portion of a filter chamber on a bottom side of top shell half $92^{IV}$. Extending upwardly from top shell half $92^{IV}$ is an inlet port $96^{IV}$ that defines a port channel (not shown). Also extending upwardly from top shell $92^{IV}$ is a luer lock female fitting $122^{IV}$ formed with threading (not shown) on an internal wall. Fitting $122^{IV}$ is formed about inlet port $96^{IV}$ and permits the attachment of a tube or other fluid and/or gas delivery component with a corresponding luer lock male fitting (not shown). Engagement of the luer lock fittings connects inlet port $92^{IV}$ with a fluid/gas source. The port channel is in fluid communication with filter chamber $91^{IV}$.

Top shell $92^{IV}$ has portions defining one or more vertically oriented locking tabs $100^{IV}$ extending downwardly and positioned radially outwardly from a perimeter shoulder $93^{IV}$ of shell $92^{IV}$. Each tab may have smooth surfaces or may be formed with one or more ribs or ridges $115^{IV}$, positioned laterally along the tab and on a top surface and/or a bottom surface of the tab to engage a corresponding wall(s) of a slot formed in bottom shell $94^{IV}$ disclosed in more detail below.

An annular filter disc securing shoulder $102^{IV}$ extends downwardly from a bottom surface of top shell $92^{IV}$ and is positioned radially inwardly from the perimeter of the shell half. An outer wall of shoulder $102^{IV}$, in combination with sections of a bottom shell half $94^{IV}$, forms a part of a sealing surface as disclosed in more detail below. The downwardly or bottom facing surface of shoulder $102^{IV}$ registers against an enclosed filter disc $106^{IV}$ and compresses a perimeter of the disc against a corresponding surface of bottom shell $94^{IV}$ to secure the disc in the shell. An annular channel is defined by a top shell annular shoulder $117^{IV}$ and shoulder $102^{IV}$ toward a radially outward edge of shoulder $102'''$ to receive a corresponding upwardly extending shoulder of bottom shell half $94'''$, disclosed in more detail below. A second partial channel $109^{IV}$ is formed on the outer annular wall of top shell annular shoulder $117^{IV}$ to receive an outer section of shoulder $112^{IV}$ as disclosed in more detail below.

Bottom shell half $94^{IV}$ defines a second portion of filter chamber $91^{IV}$ on a top side of the shell half. Extending upwardly from the top side is an annular filter support shelf $110^{IV}$ positioned to align with disc securing shoulder $102^{IV}$ when the shell halves are joined. This shelf provides a solid support surface against which to compress the perimeter of filter disc media or membrane $106^{IV}$ so as to contribute to the creation of the fluid-tight seal.

Extending upwardly from shelf $110^{IV}$ at a radially outward edge of support shelf $110^{IV}$ is bottom shell half shoulder $105^{IV}$ dimensioned to fit within the channel formed between disc securing shoulder $102^{IV}$ and top shell annular shoulder $117^{IV}$. Shoulder $105^{IV}$ registers against the opposing walls of disc securing shoulder $102^{IV}$ and top shell annular shoulder $117^{IV}$ and contributes to the formation of a fluid-right seal. Annular outer shoulder $112^{IV}$ is formed radially outwardly from shoulder $105^{IV}$ and registers against top-shell-half perimeter shoulder $109^{IV}$. The combination of shoulder $105^{IV}$ and shoulder $112^{IV}$ form bottom shelf channel $111^{IV}$ that receives top shell annular shoulder $117^{IV}$. The interlocking corresponding channels and shoulders of the upper shell $92^{IV}$ and bottom shell $94^{IV}$ create a fluid tight seal and collectively prevent lateral displacement of top shell $92^{IV}$ as well as enclosed filter disc $106^{IV}$ from bottom shell $94^{IV}$.

A perimeter of bottom shell half $94^{IV}$, radially outward of shoulder $112^{IV}$, has portions defining one or more slots $114^{IV}$ dimensioned to receive tabs $100^{IV}$. One slot is formed for each tab. Engagement of tabs $100^{IV}$ with slots $114^{IV}$ provides a mechanical lock between the housing shell halves and causes the compression of the enclosed filter disc $106^{IV}$ and the corresponding interlocking components of shell halves to ensure a fluid-tight seal.

Slots $114^{IV}$ function like a pawl of a ratchet when engaged with ridges $115^{IV}$ of tabs $100^{IV}$, which function like the teeth on cable ties or on a linear rack of a ratchet. Each ridge $115^{IV}$ is formed with a tapered surface and a secondary surface substantially orthogonal to the longitudinal axis of the tab. The slots are dimensioned and positioned to allow the passage of ridges $115^{IV}$ with the application of a force to urge top shell half $92^{IV}$ onto bottom shell half $94^{IV}$. As the tabs are urged into the slots, the distal ends of tabs $100^{IV}$ flex inwardly as each ridge $115^{IV}$ passes through one of the slots $114^{IV}$.

Inward flexion of tab $100^{IV}$ is accomplished by the registration of an edge of slot $114^{IV}$ against a tapered surface of ridge $115^{IV}$. As tab $100^{IV}$ is compressed into, and travels past slot $114^{IV}$, the tapered surfaces of ridge $115^{IV}$ (facing radially outwardly), urge the distal ends of tabs $100^{IV}$ inwardly until the apexes of ridge $115^{IV}$ pass downwardly beyond slots $114^{IV}$. Once passage is achieved, tab $100^{IV}$ flex back to substantially their original position. In this position, the orthogonal surface of ridge $115^{IV}$ that has passed through the slot registers against the bottom surface of bottom shell half $94^{IV}$ and functions to mechanically lock top shell half $92^{IV}$ onto bottom shelf half $94^{IV}$. The sequence of inward flexion and outward return of tabs $100^{IV}$ occurs for each ridge $115^{IV}$ that traverses a slot $114^{IV}$. The flexion cycle is reversed to outward flexion and inward return should ridges $115^{IV}$ be formed on inner walls of tabs $100^{IV}$.

To adjust the compressive force applied to enclosed filter disc $106^{IV}$, the tabs of top shell half $92^{IV}$ are urged into slots $114^{IV}$ and past a plurality of ridges until the desired compressive force is reached. As should be understood by those having ordinary skill in the art, only one ridge has to be passed in order to secure top shell half $92^{IV}$ to bottom shell half $94^{IV}$. The number of ridges needed to pass through the slots to effectuate a fluid-tight seal will depend, in part, on the thickness and density of the material used to form filter disc media or membrane $106^{IV}$.

Extending downwardly from a bottom surface of bottom shell $94^{IV}$ is a combination luer lock male fitting/outlet port $116^{IV}$ that defines an outlet channel (not shown). The outlet port chamber is in fluid communication with filter chamber $91^{IV}$. An outer wall of port $116^{IV}$ is formed with threading $124^{IV}$ corresponding in spacing and thickness with the treading of female fitting $120^{IV}$. This permits port $116^{IV}$ to be secured to a fluid/gas transport component with a corresponding luer lock female fitting, if needed.

To assemble the snap-fit capsule $90^{IV}$, filter disc $106^{IV}$ is placed in bottom shell half $94^{IV}$ and registered against shelf $110^{IV}$. Next, top shell half $92^{IV}$ is placed over bottom shell $94^{IV}$ so that each tab $100^{IV}$ is aligned with, and urged into, a slot $114^{IV}$. Top shell $92^{IV}$ is then compressed into bottom shell $94^{IV}$ as previously disclosed. At this point, shoulder $102^{IV}$ will be registered against filter disc $106^{IV}$ that is compressed and secured between the corresponding sections of the shell halves to create a fluid-tight seal. To remove top shell $92^{IV}$ from bottom shell $94^{IV}$, the tabs can either be snapped off, or forcibly removed by pulling on inlet port $96^{IV}$ until the top shell half is released from the bottom shell half.

Referring now to FIGS. 40 and 41, in a still further aspect of the disclosure, a single-use, O-ring-free filter media holder is shown designated generally as 130. Holder 130 has a top shell half 132 with a female luer fitting 136 extending upwardly from a top side of the half 132. A bottom shell half 134 has a male luer fitting 138 extending downwardly from a bottom side of the shell half. Top shell half 132 is formed with an annular tongue 144 that contributes to the formation of a tongue and groove seal. An annular recess 145 is formed radially outwardly from tongue 144 and an annular channel 147 is formed radially inwardly of tongue 144 to complete the first half of the tongue and groove seal.

Bottom shell half 134 is formed with an annular groove 146 dimensioned to receive and register against tongue 144.

An annular shoulder 149 extending upwardly from a perimeter of bottom shell half 134 is dimensioned to fit within and register against recess 145. An annular ridge 150 is formed in a top side of bottom shell half 134 radially inwardly of groove 146 and dimensioned to fit within and register against channel 147 to complete the second half of the tongue and groove seal.

One or more tabs 140 are formed extending radially outwardly from a perimeter of top shell half 132. One or more second tabs 142 are formed extending radially outwardly from a perimeter of bottom shell half 134. The first and second tabs are aligned when the shell halves are assembled to create pockets between them within which a finger or parting tool can be used to pry the shell halves apart to retrieve the enclosed filter disc or filter media.

If a filter disc is secured in the filter media holder 130, an annular sealing ring 148 extending downwardly from the bottom surface of top shell half 132 and positioned radially inwardly from annular channel 147 provides a registration surface to compress a perimeter edge of the enclosed filter disc against the top surface of bottom shell half 134 to create a fluid-tight seal. It should be noted that sealing ring 148 may also be formed on the top surface of bottom shell half 134 and provide the same sealing function if a filter disc is used. It should also be noted that the function of sealing ring 148 is not needed if the filter media used in filter media holder 130 is loose media.

The shell halves are assembled and secured together with discreet thermally or sonically welded spots 152. The spots ensure positive engagement of the shell halves, sufficient to maintain the integrity of the media holder during filtration procedures, but also sufficiently weak to permit detachment of the shell halves when a prying force is applied to the tabs. The number and size of the weld spots can be increased or decreased to change the overall joining force used to secure the shell halves together.

The filter discs disclosed herein may be constructed illustratively from fibrous material, including, but not limited to, microfibers and nanofibers of polyethylene, polypropylene, nylon, polyester, carbon, polypropylene sulfide (PPS), Polytetrafluoro-ethylene (Teflon® PTFE), cellulose including cellulose/diatomaceous earth or silica blends, cellulose/carbon particles or fibers, cellulose/ion exchange resins, as are available from general media suppliers; others include technical paper filtration media. Still further filter materials may include cellulose derivatives such as cellulose acetate, cotton, polyamides, polyesters, fiberglass, fluoropolymers such as perfluoroalkoxy (PFA) and its derivatives, MFA (co-polymer of tetrafluoroethylene and perfluoromethyl vinyl ether and sold under the name Hyflon®), fluorinated ethylene propylene polymer (FEP) and the like, as well as combinations of any of the disclosed filter media materials.

Each filter disc may comprise one layer or multiple layers with each layer having the same or different micron retention sizes. Filter pore sizes may range from about 0.01 microns to about 50 microns and up. The discs may be constructed from a number of manufacturing processes including, but not limited to, wet-laid processes (similar to papermaking), wet casting, melt-cast, or dry processes such as air-laid, melt-blown, spun-bond, etc. as is well known in the art. Illustratively, for discs made from polycarbonate gamma irradiated membranes are placed in a caustic etch bath to open pores in the material.

The materials used to construct the filter cups, capsules, shell halves and other non-filter disc components may be the same for all these components. The components may be injection molded with any thermal plastic materials, including, but not limited to, Polypropylene (PP), Polyethylene (PE), Nylon, Polysulfone, Perfluoroalkoxy (PFA) polymer resin, Polycarbonate (PC), PS, Polyethersulfone (PES), Ethylene-chlorotrifluoroethylene copolymer (ECTFE) and mixtures thereof. It should be understood other materials and manufacturing methods well known in the art also may be used to construct these components.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure. What I claim as new and desire to secure by United States Letters Patent is

The invention claimed is:

1. A breakaway disposable filter capsule comprising:
   a two-piece shell that defines a filter chamber; wherein the shell comprises a top shell half and a bottom shell half secured together with a frangible strip formed about registration surfaces of the shell halves and substantially coplanar with the registration surfaces, wherein the frangible strip defines a pull strip and a pair of spaced grooves each having thicknesses less than the thickness of the frangible strip, wherein the pair of spaced grooves define a border between the frangible strip and the pull strip;
   a filter disc secured in the filter chamber;
   an annular shoulder formed at a radially outward edge of the shell to register against a perimeter of the filter disc to secure the filter disc's orientation in the chamber;
   an inlet port extending from the top shell half on an upstream side of the filter, wherein the port is in fluid communication with the filter chamber; and,
   an outlet port extending from the bottom shell half on a downstream side of the filter, wherein the outlet port is in fluid communication with the filter chamber.

2. The filter capsule of claim 1 wherein the pull strip comprises a a pull tab formed on an end of the pull strip.

3. The filter capsule of claim 2 wherein the frangible strip is substantially coplanar with the filter disc.

4. The filter capsule of claim 2 wherein the filter capsule further comprises an annular ridge formed on a bottom surface of the top shell half to register against and compress the filter disc against a top surface of the bottom shell half.

5. The filter capsule of claim 4 further comprising an annular support shelf formed on a top surface of the bottom shell half radially inwardly from a perimeter of the shell half, wherein the support surface supports the filter disc.

6. The filter capsule of claim 5 wherein an annular shoulder extends upwardly from a perimeter of the bottom shell half to register against a recess formed in the perimeter of the top shell half.

7. The filter capsule of claim 1, wherein the pair of spaced grooves are substantially parallel.

8. The filter capsule of claim 7 wherein the grooves further comprise perforations spaced along the grooves to reduce the material that comprises the grooves.

9. The filter capsule of claim 7 wherein at least one groove comprises at least two regions having different thicknesses, wherein the larger of the two thicknesses is less than the thickness of the frangible strip.

10. The filter capsule of claim 1 further comprising an O-ring secured in the capsule and registered against a perimeter of the disc filter.

11. A snap-fit filter capsule apparatus comprising:
a shell defining a filter chamber and having a top shell half and a bottom shell half, wherein the top shell half is formed with laterally extending tabs and the bottom shell half is formed with an upwardly extending, annular outer shoulder defining slots corresponding to, and dimensioned to receive, the tabs, wherein axial insertion and registration of the laterally extending tabs into the slots creates a mechanical lock between the top shell half and the bottom shell half;
a filter disc secured in the filter chamber;
an annular ridge formed inside the shell to register against a perimeter of the filter disc to secure the filter disc's orientation in the chamber;
an inlet port extending from the top shell half on an upstream side of the filter, wherein the port is in fluid communication with the filter chamber; and,
an outlet port extending from the bottom shell half on a downstream side of the filter, wherein the outlet port is in fluid communication with the filter chamber.

12. The filter capsule of claim 11 wherein the tabs and slots are positioned in substantially the same plane when engaged, wherein disengagement of the shell halves exposes an upstream surface of the filter disc.

13. The filter capsule of claim 11 further comprising an O-ring registered against a perimeter of the filter disc to create a fluid-tight seal.

14. The filter capsule of claim 11 wherein the tabs are formed with a plurality of substantially parallel ribs on at least one surface of the tabs.

15. A filter cup/filter stem assembly comprising:
a filter cup with a frangible strip formed or attached to a bottom end of the filter cup, the bottom end defining a cup fluid transfer channel, wherein the frangible strip defines a pull strip and a pair of spaced grooves each having thicknesses less than the thickness of the frangible strip, wherein the pair of spaced grooves define a border between the frangible strip and the pull strip;
a filter stem having a filter disc receiving surface, wherein the filter disc receiving surface defines a stem fluid transfer channel and comprises a plurality of spaced ribs extending radially between a perimeter edge of the filter stem and the portions of the receiving surface defining the fluid transfer channel;
a filter disc media or membrane positioned on the filter disc receiving surface;
an O-ring positioned about a perimeter edge of the filter disc; and,
an outlet extending downwardly from the filter disc support surface and defining an outlet channel, wherein the outlet channel is in fluid communication with the stem transfer channel and the cup fluid transfer channel, and wherein the frangible segment has a lower lip that extends radially inwardly from a perimeter of the frangible segment and registers against a lower surface of the stem filter disc support surface to releasably lock the filter stem to the filter cup.

16. The filter cup/filter stem of claim 15 wherein the pull strip comprises a pull tab formed on and end of the pull strip.

17. The filter cup/filter stem of claim 16 wherein the frangible strip is substantially coplanar with the filter disc.

18. The filter cup/filter stem of claim 15 wherein an annular shoulder extends upwardly from a perimeter of the stem filter disc support surface to register against a corresponding recess formed in the perimeter of the bottom end of the filter cup.

19. The filter capsule of claim 15, wherein the pair of spaced grooves are substantially parallel.

20. The filter capsule of claim 19 wherein the grooves further comprise perforations spaced along the grooves to reduce the material that comprises the grooves.

* * * * *